US010864913B2

(12) United States Patent
Ide

(10) Patent No.: US 10,864,913 B2
(45) Date of Patent: Dec. 15, 2020

(54) VEHICLE DRIVING SUPPORT APPARATUS

(71) Applicant: TOYOTA JIDOSHA KABUSHIKI KAISHA, Toyota (JP)

(72) Inventor: Hirohito Ide, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 16/144,389

(22) Filed: Sep. 27, 2018

(65) Prior Publication Data

US 2019/0092331 A1 Mar. 28, 2019

(30) Foreign Application Priority Data

Sep. 28, 2017 (JP) .................................. 2017-187495

(51) Int. Cl.
| | |
|---|---|
| *B60W 30/165* | (2020.01) |
| *B60W 10/20* | (2006.01) |
| *G08G 1/16* | (2006.01) |
| *B62D 15/02* | (2006.01) |
| *G01S 13/931* | (2020.01) |

(52) U.S. Cl.
CPC .......... *B60W 30/165* (2013.01); *B60W 10/20* (2013.01); *B62D 15/025* (2013.01); *B62D 15/026* (2013.01); *G01S 13/931* (2013.01); *G08G 1/166* (2013.01); *G08G 1/167* (2013.01); *G01S 2013/9318* (2020.01); *G01S 2013/9321* (2013.01); *G01S 2013/9325* (2013.01); *G01S 2013/9327* (2020.01)

(58) Field of Classification Search
CPC .... B60W 10/20; B60W 30/09; B60W 30/165; B60W 30/18145; B60W 30/18163; B62D 15/025; B62D 15/026; G01S 13/931; G01S 2013/9318; G01S 2013/9321; G01S 2013/9325; G01S 2013/9327; G08G 1/166; G08G 1/167
See application file for complete search history.

(56) References Cited

U.S. PATENT DOCUMENTS

| | | | |
|---|---|---|---|
| 10,576,980 B2 * | 3/2020 | Tsuji ...................... B60W 30/14 |
| 2005/0270145 A1 | 12/2005 | Kataoka et al. |
| 2006/0025918 A1 | 2/2006 | Saeki |
| 2010/0324797 A1 | 12/2010 | Fritz |

(Continued)

FOREIGN PATENT DOCUMENTS

| | | |
|---|---|---|
| JP | 2004-322916 A | 11/2004 |
| JP | 2006-315491 A | 11/2006 |

(Continued)

*Primary Examiner* — Rachid Bendidi
(74) *Attorney, Agent, or Firm* — Sughrue Mion, PLLC

(57) ABSTRACT

A driving support ECU retains an already-present traveling trajectory of a first vehicle to determine a target traveling line based on the retained already-present traveling trajectory during a specific period. When a specific situation occurs in the specific period, the driving support ECU produces a traveling trajectory of the first vehicle in such a manner that the traveling trajectory of the first vehicle is continuous with the already-present traveling trajectory based on position information of the first vehicle and the retained traveling trajectory to determine the target traveling line based on the produced traveling trajectory.

6 Claims, 7 Drawing Sheets

(56) References Cited

U.S. PATENT DOCUMENTS

| | | | | |
|---|---|---|---|---|
| 2016/0159353 A1* | 6/2016 | Yun | ................ | B60W 30/16 |
| | | | | 701/93 |
| 2016/0339914 A1* | 11/2016 | Habu | ................ | B60W 30/12 |
| 2017/0232966 A1* | 8/2017 | Ishioka | ................ | B60W 10/04 |
| | | | | 701/96 |
| 2018/0297594 A1* | 10/2018 | Takahashi | ................ | G05D 1/0278 |
| 2019/0217861 A1* | 7/2019 | Kurahashi | ................ | G08G 1/166 |
| 2019/0308625 A1* | 10/2019 | Iimura | ................ | B60W 30/165 |

FOREIGN PATENT DOCUMENTS

| | | |
|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 2011-514580 A | 5/2011 |
| JP | 4929777 B2 | 5/2012 |
| JP | 2014-148293 A | 8/2014 |

\* cited by examiner

VEHICLE DRIVING SUPPORT APPARATUS

BACKGROUND OF THE INVENTION

1. Field of the Invention

The present invention relates to a vehicle driving support apparatus configured to perform a steering control for causing an own vehicle to travel along a target traveling line determined/calculated based on a traveling trajectory of a preceding vehicle which is an other vehicle traveling in a front area of (ahead of) the own vehicle.

2. Description of the Related Art

A vehicle driving support apparatus (hereinafter, referred to as a "conventional apparatus"), which has been conventionally known, recognizes a three-dimensional object as a target object through the use of a surroundings monitoring sensor (for example, radar sensor). The surroundings monitoring sensor assigns/gives "identification information (hereinafter, referred to as a "target object ID") for identifying (specifying) each of the target objects to each of the target objects" in order to distinguish the target objects from each other.

The conventional apparatus recognizes, as one or more of preceding vehicles, one or more of the target objects which travel in front (ahead) of the own vehicle from among one or more of the target objects detected by the surroundings monitoring sensor. The conventional apparatus determines/select one of the preceding vehicles (hereinafter, referred to as a "following-travel steering target vehicle") which functions/serves as a target for producing/generating a "traveling trajectory for determining a target traveling line" from among the one or more of the preceding vehicles, based on a behavior of the own vehicle. That is, the conventional apparatus identifies/obtains the target object ID (hereinafter, referred to as a "target vehicle ID") of the steering following target vehicle. The conventional apparatus produces/generates the traveling trajectory of the specified following-travel steering target vehicle, and performs a steering control so as to cause the own vehicle to travel along the target traveling line determined/calculated based on the produced/generated traveling trajectory (for example, refer to Japanese Unexamined Patent Application Publication (Translation of PCT Application) No. 2011-514580).

The steering control performed so as to cause the own vehicle to travel along the target traveling line determined/calculated based on the produced/generated traveling trajectory of the following-travel steering target vehicle is also referred to as a "following-travel steering control".

When the following-travel steering target vehicle has changed from a first vehicle to a second vehicle (that is, the target vehicle ID has been changed), the conventional apparatus resets/clears the traveling trajectory of the first vehicle, and newly produces/generates a traveling trajectory of the second vehicle. Then, the conventional apparatus starts performing the following-travel steering control with the use of the target traveling line determined/calculated based on the traveling trajectory of that second vehicle.

As described later in detail, since the following-travel steering target vehicle is determined based on the behavior (for example, a traveling direction of the own vehicle) of the own vehicle, a case occurs where a vehicle different from a correct/proper following-travel steering target vehicle may be temporarily specified/determined as the following-travel steering target vehicle (refer to FIG. 4). Furthermore, when a situation occurs where an other vehicle approaches the correct/proper following-travel steering target vehicle and thereafter moves away from the correct/proper following-travel steering target vehicle, the target object ID which has been assigned/given to the correct/proper following-travel steering target vehicle may be handed over (erroneously assigned) to that other vehicle, and another target object ID different from that handed-over target object ID may be assigned/given to the correct/proper following-travel steering target vehicle (refer to FIG. 5).

In those cases described above, an already-present traveling trajectory is reset due to the change of the target vehicle ID. Accordingly, an already-present target traveling line determined based on the already-present traveling trajectory is reset/cleared, and the target traveling line is started to be newly produced/generated. In those cases, however, even when the proper/correct following-travel steering target vehicle continues traveling in front (ahead) of the own vehicle, continuity of "the traveling trajectory and the target traveling line" decreases/degrades, because the traveling trajectory and the target traveling line are newly produced/generated. As a result, the reliability of the following-travel steering control may decrease/degrade.

SUMMARY OF THE INVENTION

The present invention has been made in order to solve the above-described problem. That is, one of objects of the present invention is to provide a vehicle driving support apparatus capable of reducing "a possibility that the reliability of the following-travel steering control is decreased/degraded" when the target vehicle ID has changed. Hereinafter, the vehicle driving support apparatus according to the present invention is also referred to as a "present invention apparatus".

The present invention apparatus includes:

target object information acquisition means (17,10) for acquiring target object information including position information indicative of a longitudinal distance with respect to an own vehicle (SV) of a preceding vehicle traveling (TV) in a front area of the own vehicle and a lateral distance with respect to the own vehicle of the preceding vehicle, and a target object ID for identifying the preceding vehicle;

target vehicle specifying means (10, step 715) for executing, every time a predetermined time elapses, processes:

for specifying a following-travel steering target vehicle from among one or more of the preceding vehicles based on the target object information and a traveling direction of the own vehicle which is extrapolated based on a driving state of the own vehicle; and for acquiring the target object ID of the specified following-travel steering vehicle as a target vehicle ID; and traveling control means (10, step 733) for performing a following-travel steering control to change a steering angle (θ) of the own vehicle in such a manner that the own vehicle travels along a target traveling line (L1, Lp1, Lp2), the traveling control means being configured:

to determine whether or not a present target vehicle ID which is the target vehicle ID lastly acquired and a previous target vehicle ID which is the target vehicle ID acquired before the present target vehicle ID is acquired are different from each other (refer to step 724);

when it is determined that the present target vehicle ID and the previous target vehicle ID are identical to each other (refer to a "No" determination at step 724), to produce a traveling trajectory of the preceding vehicle having the present target vehicle ID based on the position information of the preceding vehicle having the present target vehicle ID (refer to step 727) and determine the target traveling line based on the produced traveling trajectory of the preceding vehicle having the present target vehicle ID (refer to step 733);

when it is determined that the present target vehicle ID and the previous target vehicle ID are different from each other (refer to a "Yes" determination at step 724), to retain an already-present traveling trajectory (Lp1) (refer to step 754) and determine the target traveling line based on the retained already-present traveling trajectory (refer to step 733) for a specific period from a determination time point at which it is determined that the present target vehicle ID and the previous target vehicle ID are different from each other to a time point at which a first time (T1) elapses from the determination time point, the already-present traveling trajectory being the traveling trajectory produced based on the position information of the preceding vehicle having the previous target vehicle ID up to the determination time point; and when, in the specific period, a specific situation occurs (refer to a "Yes" determination at step 766 and a "Yes" determination at step 769) where the preceding vehicle having an identical target object ID continues being specified as the following-travel steering target vehicle over a second time (T2) shorter than the first time in an area having a distance (Dsy1) which is equal to or smaller than a predetermined threshold distance (Dth) in a lane width direction with respect to the target traveling line determined based on the retained traveling trajectory (Lp1), to produce the traveling trajectory (Lp2) of the preceding vehicle having the identical target object ID in such a manner that the traveling trajectory of the preceding vehicle having the identical target object ID is continuous with the already-present traveling trajectory based on the position information of the preceding vehicle having the identical target object ID and the retained already-present traveling trajectory (refer to step 775) and determine the target traveling line based on the generated traveling trajectory of the preceding vehicle having the identical target object ID (refer to step 733).

The following-travel steering target vehicle is specified based on the target object information of the preceding vehicle and the traveling direction of the own vehicle which is extrapolated/predicted based on the driving state of the own vehicle. Therefore, a case may occur where a vehicle (referred to as a different vehicle) different from the proper/correct following-travel steering target vehicle is specified temporarily as the following-travel steering target vehicle. Furthermore, when a situation occurs where the different vehicle approaches the proper/correct following-travel steering target vehicle and then moves away from the proper/correct following-travel steering target vehicle, the target object ID which has been assigned/given to the proper/correct following-travel steering target vehicle may be handed over (or assigned) to that different vehicle, and another target object ID different from that target object ID which has been assigned/given to the proper/correct following-travel steering target vehicle may be assigned/given to the proper/correct following-travel steering target vehicle.

In these case, since the target vehicle ID is changed, the already-present traveling trajectory is reset/cleared, and the traveling trajectory and the target traveling line starts to be newly produced/generated. However, even when the proper/correct following-travel steering target vehicle continues traveling in front (ahead) of the own vehicle actually, the traveling trajectory as well as the target traveling line are newly produced/generated. Thus, continuity of the traveling trajectory and the target traveling line decreases. Consequently, reliability of the following-travel steering control may decrease/degrade.

In contrast, the traveling control means of the present invention apparatus is configured to determine whether or not the "present target vehicle ID being the latest target vehicle ID" and the "previous target vehicle ID being the target vehicle ID which has been acquired/obtained before the present target vehicle ID is acquired" are different from each other.

Furthermore, when the present target vehicle ID and the previous target vehicle ID are determined to be different from each other, the traveling control means of the present invention carry out the following processes (1) and (2).

(1) The traveling control means retains the already-present traveling trajectory and determines the target traveling line based on the retained already-present traveling trajectory for the specific period. The traveling control means continues performing the steering control (the following-travel steering control) for the specific period. The already-present traveling trajectory is the traveling trajectory which has been produced based on the position information of the preceding vehicle having the previous target vehicle ID up to the determination time point. The specific period is the period from "the determination time point at which it is determined that the present target vehicle ID and the previous target vehicle ID are different from each other" to "the time point at which the first time elapses from the determination time point".

(2) when, in the specific period, the specific situation occurs where the preceding vehicle having the identical target object ID continues being specified as the following-travel steering target vehicle over the second time shorter than the first time in the area having a distance which is equal to or smaller than a predetermined threshold distance in a lane width direction with respect to the target traveling line determined based on the retained traveling trajectory, the traveling control means produces the traveling trajectory of the preceding vehicle having the identical target object ID in such a manner that the traveling trajectory of the preceding vehicle having the identical target object ID is continuous with the already-present traveling trajectory based on the position information of the preceding vehicle having the identical target object ID and the retained already-present traveling trajectory.

Therefore, even when the target vehicle ID is erroneously changed, the traveling trajectory is not reset/cleared unnecessarily, and thus, the continuity of the traveling trajectory does not degrade. Accordingly, the possibility that the reliability of the following-travel steering control degrades/decreases can be reduced.

In one of aspects of the present invention apparatus,
the traveling control means is configured:
to perform a first steering angle magnitude limiting process for limiting the steering angle in such a manner that a magnitude of the steering angle does not exceed a first steering angle guard value (refer to 730), when performing the following-travel steering control using the target traveling line determined not based on the retained already-present traveling trajectory; and
to perform a second steering angle magnitude limiting process for limiting the steering angle in such a manner that the magnitude of the steering angle does not exceed a second steering angle guard value smaller than the first steering angle guard value (refer to 757), when performing the following-travel steering control using the target traveling line determined based on the retained already-present traveling trajectory but not based on the position information of the preceding vehicle having the present target vehicle ID.

When the following-travel steering control is performed with the use of the target traveling line determined based on the retained already-present traveling trajectory but not based on the position information of the preceding vehicle having the present target vehicle ID, the reliability of the target traveling is likely to be lower than that when the following-travel steering control is performed with the use of the target traveling line determined not based on the retained already-present traveling trajectory.

In view of the above, the above-mentioned aspect limits the steering angle in such a manner that the magnitude of the steering angle does not exceed the second steering angle guard value smaller than the first steering angle guard value, when performing the following-travel steering control with the use of the target traveling line determined based on the retained already-present traveling trajectory but not based on the position information of the preceding vehicle having the present target vehicle ID. Therefore, the above-mentioned aspect can prevent the steering of the own vehicle from being changed suddenly, even when reliability of the retained traveling trajectory is low. Accordingly, the above-mentioned aspect can reduce the possibility that the traveling stability of the own vehicle degrades.

In one of aspects of the present invention apparatus, the traveling control means is configured:
to perform a first steering angle speed magnitude limiting process for limiting the steering angle in such a manner that a magnitude of a steering angle speed which is an amount of change per unit time of the steering angle does not exceed a first steering angle speed guard value (refer to step 730), when performing the following-travel steering control using the target traveling line determined not based on the retained already-present traveling trajectory; and
to perform a second steering angle speed magnitude limiting process for limiting the steering angle in such a manner that the magnitude of the steering angle does not exceed a second steering angle speed guard value smaller than the first steering angle speed guard value (refer to step 757), when performing the following-travel steering control using the target traveling line determined based on the retained already-present traveling trajectory but not based on the position information of the preceding vehicle having the present target vehicle ID.

The above-mentioned aspect limits the steering angle in such a manner that the magnitude of the steering angle does not exceed the second steering angle speed guard value smaller than the first steering angle speed guard value, when performing the following-travel steering control using the target traveling line determined based on the retained already-present traveling trajectory but not based on the position information of the preceding vehicle having the present target vehicle ID. Therefore, the above-mentioned aspect can prevent the steering of the own vehicle from being changed suddenly, even when reliability of the retained traveling trajectory is low. Accordingly, the above-mentioned aspect can reduce the possibility that the traveling stability of the own vehicle degrades.

In one of aspects of the present invention apparatus, when the specific situation does not occur in the specific period (refer to a "No" determination at step 763), the traveling control means is configured to newly produce the traveling trajectory of the preceding vehicle having the present target vehicle ID based on the position information of the preceding vehicle having the present target vehicle ID without using the retained traveling trajectory (refer to step 784 and step 742) to determine the target traveling line based on the newly produced traveling trajectory (refer to step 733), after a time point at which the first time has elapsed from the determination time point.

According to the above-mentioned aspect, when the specific situation does not occur in the specific period, the target traveling line is determined based on the newly produced traveling trajectory produced based on the position information of the preceding vehicle having the present target vehicle ID without using the retained traveling trajectory, after the time point at which the first time has elapsed from the determination time point. This can avoid performing the following-travel steering control with the use of the target traveling line whose degree of accuracy decreases as the time which has elapsed from the time point at which the traveling trajectory started being retained becomes longer.

In one of aspects of the present invention apparatus, the traveling control means is configured:
to determine whether or not the already-present traveling trajectory is along a traveling lane in which the own vehicle travels (refer to step 745), when it is determined that the present target vehicle ID and the previous target vehicle ID are different from each other (refer to a "Yes" determination at step 724); and
to produce the traveling trajectory of the preceding vehicle having the present target vehicle ID based on the position information of the preceding vehicle having the present target vehicle ID without retaining the already-present traveling trajectory (refer to step 739 and step 742) to determine the target traveling line based on the produced traveling trajectory of the preceding vehicle having the present target vehicle ID (refer to step 742), when it is determined that the already-present traveling trajectory is not along the traveling lane (refer to a "No" determination at step 745).

According to the above-mentioned aspect, since the already-present traveling trajectory which is determined to be not along the traveling lane and thus is likely to have a low reliability is not retained, only the already-present traveling trajectory having higher degree of accuracy is retained. Therefore, when the following-travel steering control is performed with the use of the target traveling line determined based on the retained already-present traveling trajectory but not based on the position information of the preceding vehicle having the present target vehicle ID, the above-mentioned aspect can decrease the possibility that the following-travel steering control with the low degree of accuracy is performed.

In one of aspects of the present invention apparatus, the traveling control means is configured:
to determine whether or not the preceding vehicle having the present target vehicle ID is a cutting-in vehicle being a vehicle which is cutting in or has cut in between the preceding vehicle having the previous target vehicle ID and the own vehicle (refer to step 736), when it is determined that the present target vehicle ID and the previous target vehicle ID are different from each other (refer to a "Yes" determination at step 724); and to produce the traveling trajectory of the preceding vehicle having the present target vehicle ID based on the position information of the preceding vehicle having the present target vehicle ID without retaining the already-present traveling trajectory (refer to step 739 and step 742) to determine the target traveling line based on the produced traveling trajectory of the preceding vehicle having the present target vehicle ID (step 733), when it is determined that the preceding vehicle having the present target vehicle ID is the cutting-in vehicle (refer to a "No" determination at step 736).

In the case where it is determined that the present target vehicle ID and the previous target vehicle ID are different from each other, the above-mentioned aspect determines the target traveling line based on the traveling trajectory of the preceding vehicle having the present target vehicle ID without retaining the already-present traveling trajectory, when it is determined that the preceding vehicle having the present target vehicle ID is the cutting-in vehicle. Accordingly, when the situation occurs where the cutting-in vehicle is present, the above-mentioned aspect can decrease the possibility that the following-travel steering control with the low degree of accuracy is performed.

In the above description, references used in the following descriptions regarding embodiments are added with parentheses to the elements of the present invention, in order to assist in understanding the present invention. However, those references should not be used to limit the scope of the invention.

BRIEF DESCRIPTION OF THE DRAWINGS

FIG. 3A is a plan view for illustrating the lane keeping control.

FIG. 3B is a numerical expression for explaining relationship between coefficients of a cubic function of a traveling trajectory and a curvature and the like.

FIG. 3C is the numerical expression for explaining the relationship between coefficients of the cubic function of the traveling trajectory and the curvature and the like.

DETAILED DESCRIPTION OF THE EMBODIMENT

Figure 1:
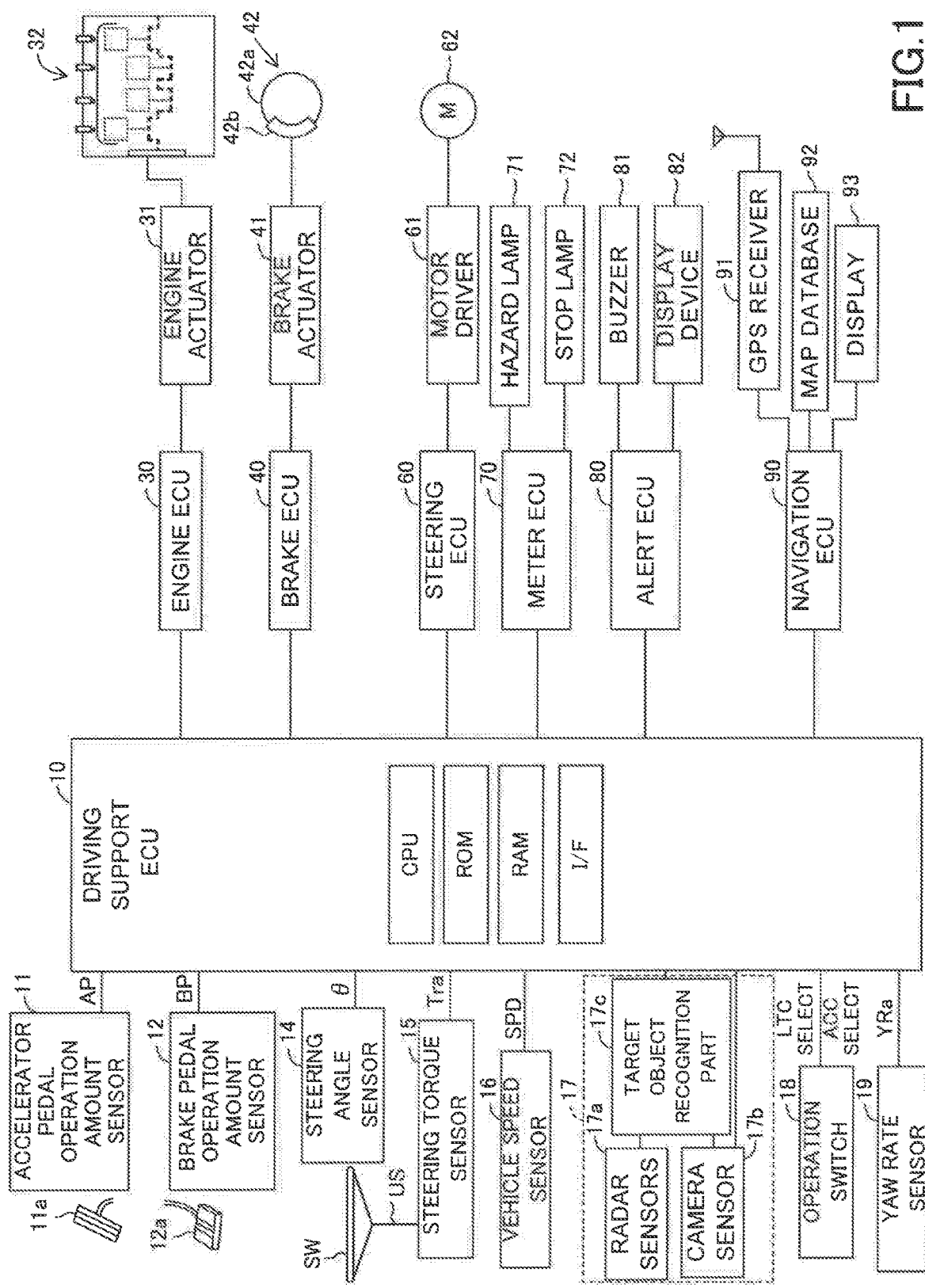
FIG. 1 is a schematic configuration diagram for illustrating a vehicle driving support apparatus according to an embodiment of the present invention.

A vehicle driving support apparatus (hereinafter, also referred to as a "present embodiment apparatus") according to an embodiment of the present invention will be described below, referring to drawings. The present embodiment apparatus is also a vehicle traveling control apparatus. It should be noted that, throughout all of the drawings, the same reference numerals are assigned to the same or corresponding parts.

<Construction>

As shown in FIG. 1, the present embodiment apparatus is applied to a vehicle (an automobile). The vehicle to which the present embodiment apparatus is applied is also referred to as an "own vehicle" to distinguish the vehicle from other vehicles. The present embodiment apparatus includes a driving support ECU 10, an engine ECU 30, a brake ECU 40, a steering ECU 60, a meter ECU 70, an alert ECU 60, and a navigation ECU 90. It should be noted that the driving support ECU 10 is simply referred to (expressed) as a "DSECU", in the following description.

Each of those ECUs is an electronic control unit comprising a microcomputer as a main part. The ECUs are connected with each other via a CAN (Controller Area Network) which is not illustrated so that they are capable of mutually transmitting and receiving information. The microcomputer includes a CPU, a ROM, a RAM, a non-volatile memory, an interface I/F, and the like. The CPU is configured to realize various functions by executing instructions (programs, routines) stored in the ROM. Some or all of these ECUs may be integrated into a single ECU.

The DSECU is connected to sensors (including switches) described below, and is configured to receive a detection signal or an output signal of each of the sensors. It should be noted that each of the sensors may be connected to one of the ECUs other than the DSECU. In this case, the DSECU receives the detection signal or the output signal of the sensor via CAN from the ECU connected to that sensor.

An accelerator pedal operation amount sensor 11 is configured to detect an operation amount (an accelerator opening degree) of an accelerator pedal 11a of the own vehicle to output a signal indicative of the detected operation amount (the accelerator pedal operation amount AP). A brake pedal operation amount sensor 12 is configured to detect an operation amount of a brake pedal 12a to output a signal indicative of the detected operation amount (the brake pedal operation amount BP).

A steering angle sensor 14 is configured to detect a steering angle of the own vehicle to output a signal indicative of the detected steering angle (the steering angle θ). A steering torque sensor 15 is configured to detect a steering torque applied to a steering shaft US of the own vehicle by an operation of the steering wheel SW to output a signal indicative of the detected steering torque (the steering torque Tra). A vehicle speed sensor 16 is configured to detect a traveling speed (a vehicle speed) of the own vehicle to output a signal indicative of the detected vehicle speed (the vehicle speed SPD).

A surroundings monitoring sensor 17 includes a radar sensor 17a, camera sensor 17b, and a target object recognition part. The surroundings monitoring sensor 17 is configured to acquire/obtain at least one of information on a road in front (ahead) of the own vehicle and information on a three-dimensional object present on that road. For example, the three-dimensional objects include moving objects such as pedestrians, bicycles, and automobiles, as well as stationary objects such as utility poles, trees and guardrails. Hereinafter, these three-dimensional objects may be referred to as "target objects" in some cases.

The surroundings monitoring sensor 17 is configured to determine whether or not the target object is present, based on the information obtained by at least one of the radar sensor 17a and the camera sensor 17b and to calculate "information (hereinafter, referred to as "target object information") on a target object (n)" including "a longitudinal distance Dfx(n), a lateral position Dfy(n), and a relative speed Vfx(n)" of the target object (n), as well as a target object ID identifying/specifying the target object (n) so as to output the calculated target object information of the target object (n).

Figure 2:
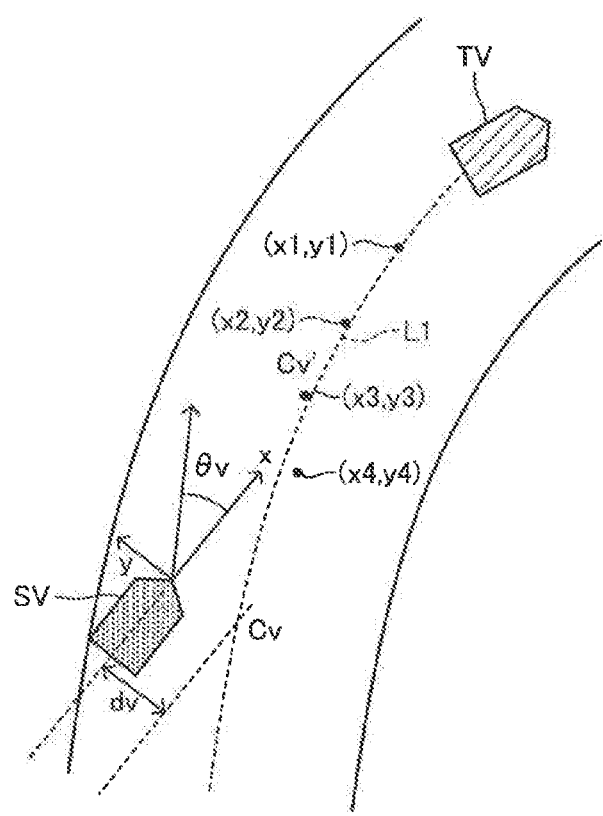
FIG. 2 is a plan view for illustrating a lane keeping control.

It should be noted that the surroundings monitoring sensor 17 acquires/obtains these values included in the target object information expressed on a predefined x-y coordinate system (refer to FIG. 2).

An X axis is a coordinate axis which extends along a longitudinal direction of the own vehicle so as to pass through a center position in a vehicle width direction of a front-end part of the own vehicle SV. The X axis defines a positive coordinate value for a position in a front direction of the own vehicle SV.

A Y axis is a coordinate axis which is orthogonal to the X axis. The V axis defines a positive coordinate value for a position in a left direction of the own vehicle SV.

Each of an origin of the X axis and an origin of the Y axis coincide with the center position of the front-end part of the own vehicle SV in the vehicle width direction.

An X coordinate position on the x-y coordinate system is referred to as a "longitudinal distance Dfx". A Y coordinate position on the x-y coordinate system is referred to as a "lateral position Dfy".

The longitudinal distance Dfx(n) of the target object (n) is a distance (having a sign of plus or minus) in a center axis direction (an x axis direction) of the own vehicle between the front-end part of the own vehicle and the rear-end part of the target object (n). For example, the target object (n) is a preceding vehicle.

The lateral position Dfy(n) of the target object (n) is a distance (having a sign of plus or minus) between a center position of the target object (n) and a center position of the own vehicle in a direction (a V axis direction) orthogonal to the central axis of the own vehicle. For example, the center position of the target object (n) is a center position of the rear-end part of the preceding vehicle in the vehicle width direction.

The relative speed Vfx (n) of the target object (n) is a difference (=Vs−Vj) between a speed Vs of the target object (n) and the speed Vj (=SPD) of the own vehicle. The speed Vs of the target object (n) is a speed in the center axis direction (the x axis direction) of the own vehicle. It should be noted that the longitudinal distance Dfx(n) and the lateral position Dfy(n) are collectively referred to as "position information"

More specifically, the radar sensor 17a shown in FIG. 1 includes a radar wave transmitting/receiving section and a processing section. The radar wave transmitting/receiving section radiates/emits an electric wave (hereinafter, referred to as a "millimeter wave") in a millimeter waveband to peripheral areas (surroundings) including at least a front area of the own vehicle, and receives a reflected wave generated through reflection of the radiated millimeter wave at a part (that is, a reflection point) of a three-dimensional object. It should be noted that the radar sensor 17a may be a radar sensor using an electric wave (a radar wave) in a frequency band other than the millimeter waveband.

The processing section of the radar sensor 17a determines absence or presence of the target object, based on reflection point information including a phase difference between the transmitted millimeter wave and the received reflected wave, an attenuation level of the reflected wave, and a time (period) from when the millimeter wave is transmitted to when the reflected wave is received. The processing section of the radar sensor 17a performs grouping (integrating, fusing) "a plurality of the reflection points" which are highly likely to be obtained from a single three-dimensional to recognize a "group of the grouped reflection points" as a "target object (a single target object)", and assigns/gives the target object ID which is an identification information for identifying/specifying the recognized target object (the single target object) to the recognized target object.

Furthermore, the processing section of the radar sensor 17a acquires/calculates information (hereinafter, referred to as "radar sensor detection information") including a longitudinal distance Dfx of the target object, a direction $\theta_p$ of the target object with respect to the own vehicle, the relative speed Vfx between the own vehicle and the target object, and the like, based on the reflection point information of the reflection point belonging to the target object which has been recognized.

The camera sensor 17b includes a stereo camera and an image processing part. The stereo camera photographs (takes an image of) views/landscapes of "the left and the right side area" in front of (ahead of) the own vehicle so as to acquire a pair of right and left image data (images of the views/landscapes). The image processing part determines whether or not the target object is present within a photographed area, based on a pair of the right and left image data. When it is determined that the target object is present, the image processing part acquires/calculates information (hereinafter, referred to as "camera sensor detection information") including the direction θp of the target object, the longitudinal distance Dfx of the target object, the relative speed Vfx between the own vehicle and the target object, and the like.

The target object recognition part 17c is connected to each of the processing section of the radar sensor 17a and the image processing part of the camera sensor 17b in communicable state to receive the "radar sensor detection information" and the "camera sensor detection information". The target object recognition part 170 determines (obtains/acquires) the "target object information including the target object ID, the longitudinal distance Dfx(n), the lateral position Dfy(n), and the relative speed Vfx(n)" of the recognized target object (n) by using at least one of the "radar sensor detection information" and the "camera sensor detection information". It should be noted that the target object recognition part 17c analyzes the image (image data) transmitted from the camera sensor 17b to determine whether or not the target object detected by the radar sensor 17a is a ghost target object which is an insubstantial/intangible target object caused by reflection of the millimeter wave. That is, the DSECU is configured not to recognize the ghost target object (the ghost) acquired/obtained by the radar sensor 17a as a "target object (n) including a vehicle".

The target object recognition part 17c transmits the determined/acquired target object information to the DSECU, every time a predetermined time elapses.

It should be noted that when both of the "radar sensor detection information" and the "camera sensor detection information" of a certain target object (n) are acquired/obtained, the target object recognition part 17c fuses (integrates) them as described below, thereby determining (acquiring/obtaining) final target object information of the target object (n). In this case, the target object recognition part 17c adopts the target object ID included in the radar sensor detection information as the target object ID.

In contrast, when only one of the "radar sensor detection information" and the "camera sensor detection information" of a certain target object (n) has been detected, the target object recognition part 17c acquires/obtains (determines) the final target object information of the target object (n) based only the information which has been detected, and transmits that final target object information to the DSECU, every time a predetermined time elapses. In this case, when only the radar sensor detection information has been detected, the target object ID is the target object ID included in the radar sensor detection information. In contrast, when only the camera sensor detection information has been detected, the target object recognition part 17c assigns/gives a new target object ID to "the target object which has been recognized by the camera sensor detection information" so that target object ID of the target object which has been recognized does not overlap the already-present target object ID, and transmits the new target object ID to the DSECU.

Furthermore, the image processing part of the camera sensor 17b recognizes/detects lane markers (hereinafter, also simply referred to as "white lines") such as left and right white lines on a road and the like, based on a pair of the right and left image data. In addition, the image processing part calculates a shape (for example, a curvature radius) of an own vehicle traveling lane in which the own vehicle is traveling and a positional relationship between the own vehicle traveling lane and the own vehicle, every time a predetermined time elapses to transmit those calculated shape and positional relationship to the DSECU. The positional relationship between the own traveling lane and the own vehicle is defined/represented by a distance in the lane width direction between "a center position (that is, the center line) between the left white line and the right white line of the own traveling lane" and "the center position of the own vehicle in the vehicle width direction":

an angle (that is, a yaw angle) formed by a direction of the center line and the x axis direction of the own vehicle; and the like, for example.

It should be noted that the information such as the shape of the own vehicle traveling lane, the positional relationship in the lane width direction and the like may be provided from the navigation ECU 90.

An operation switch 18 is a switch operated by a driver of the own vehicle. The driver can operate the operation switch 18 to select whether or not a lane keeping control including a following-travel steering control described later is to be performed. In addition, the driver can operate the operation switch 18 to select whether or not an inter-vehicle-distance control (following inter-vehicle-distance control) is to be performed.

A yaw rate sensor 19 is configured to detect a yaw rate of the own vehicle to output a signal indicative of the detected yaw rate (an actual yaw late YRt).

The engine ECU 30 is connected to an engine actuator 31. The engine actuator 31 is an actuator for changing an operation state of an internal combustion engine 32. The engine actuator 31 includes at least a throttle valve actuator for changing an opening degree of the throttle valve. The engine ECU 30 changes the torque generated by the internal combustion engine 32 by driving the engine actuator 31 so as to control a driving force of the own vehicle, to thereby be able to change an acceleration state (acceleration) of the own vehicle.

The brake ECU 40 is connected to a brake actuator 41. The brake actuator 41 is provided in a hydraulic pressure circuit provided between a master cylinder (not shown) and a friction brake mechanism 42 provided in each of right-and-left front-and-rear wheels. The brake actuator 41 adjusts, in response to an instruction from the brake ECU 40, a hydraulic pressure to be supplied to a wheel cylinder built in the brake caliper 42b of the friction brake mechanism 42 to press a brake pad onto a brake disk 42a using the hydraulic pressure so as to generate a friction braking force. Therefore, the brake ECU 40 controls the brake actuator 41 to control a braking force applied to the own vehicle, to thereby be able to change the acceleration state of the own vehicle (in this case, a deceleration).

The steering ECU 60 is a control unit of a well-known electric power steering system and is connected to a motor driver 61. The motor driver 61 is connected to a steering motor 62. The steering motor 62 is incorporated into a "steering mechanism including a steering wheel SW, a steering shaft US, a gear mechanism (not shown) for steering, and the like". The steering motor 62 generates torque using electric power supplied from the motor driver 61, to thereby be able to generate a steering assist torque or steer the left-and-right steered wheels using the generated torque. That is, the steering motor 62 can change a steering angle (also referred to as a "turning angle") of the own vehicle.

The meter ECU 70 is connected to a digital display meter (not shown). Furthermore, the meter ECU 70 is also connected to a hazard lamp(s) 71 and a stop lamp(s) 72 and can change lighting states of them in response to instructions transmitted from the DSECU.

The alert ECU 80 is connected to a buzzer 81 and a display device 82. The alert ECU 80 can causes the buzzer 81 to generate sounds to alert the driver in response to an instruction transmitted from the DSECU. In addition, the alert ECU 80 can cause the display device 82 to light (turn on) an attention/alert mark such as a warning lamp.

The navigation ECU 90 is connected to a GPS receiver 91 which receives a GPS detection signal for detecting a present position of the own vehicle, a map database 92 which stores a map information and the like, a touch-screen type display 93, and the like. The navigation ECU 90 identifies the present position of the own vehicle based on the GPS detection signal. When the own vehicle is traveling in a road including a plurality of lanes, the navigation ECU 90 can acquire/obtain information for identifying the lane in which the own vehicle is traveling currently. The navigation ECU 90 executes various calculation processes based on the present position of the own vehicle, the map information stored in the map database 92, and the like, to perform a route guidance using the display 93 based on that calculation processing result.

<Outline of Operation>

The outline of the operation of the present embodiment apparatus will next be described. The DSECU of the present embodiment apparatus is configured to perform both of the inter-vehicle-distance control and the lane keeping control. In the following description, "the inter-vehicle-distance control and the lane keeping control" will be described.

<Inter-Vehicle-Distance Control (ACC: Adaptive Cruise Control)>

The inter-vehicle-distance control (that is, the following-travel inter-vehicle-distance control) is a control for causing the own vehicle travel to follow a preceding vehicle which is present in the front area of the own vehicle and which travels immediately in front (ahead) of the own vehicle, while maintaining an inter-vehicle distance (that is, a longitudinal distance Dfx(n) of that preceding vehicle with respect to the own vehicle) between the preceding vehicle and the own vehicle at a predetermined target inter-vehicle distance. The following-travel inter-vehicle-distance control is well known (for example, refer to Japanese Patent Application Laid-Open No. 2014-148293, No. 2006-315491, Japanese Patent No. 4172434, and Japanese Patent No. 4929777). Therefore, the inter-vehicle-distance control (the following-travel inter-vehicle-distance control) will be described briefly.

The DSECU performs the inter-vehicle-distance control when the inter-vehicle-distance control is requested through the operation of the operation switch 18

First, when the inter-vehicle-distance control is requested, the DSECU specifies a following target vehicle to be followed based on the target object information of the target object (n) obtained/detected by the surroundings monitoring sensor 17. Hereinafter, the following target vehicle is referred to as an "inter-vehicle-distance target vehicle". More specifically, as will be described below, the DSECU determines (specifies) the inter-vehicle-distance target vehicle from among one or more of the other vehicles (that is, one or more of preceding vehicles) traveling in the front area of the own vehicle.

Step 1A: the DSECU acquires/obtains "the vehicle speed SPD of the own vehicle" from the vehicle speed sensor 16 and acquires/obtains "the yaw rate Yrt of the own vehicle" from the yaw rate sensor 19. "The vehicle speed SPD of the own vehicle and the yaw rate Yrt of the own vehicle" are motion state quantity of the own vehicle.

Step 2A: the DSECU predicts/extrapolates a traveling course in which the own vehicle will travel in the x-y coordinates, based on the vehicle speed SPD and the yaw rate Yrt.

Step 3A: the DSECU determines (selects/sets) the other vehicle having an absolute value of the distance in a lane width direction with respect to the predicted/extrapolated traveling course of the own vehicle being equal to or smaller than a first reference threshold, as an inter-vehicle-distance target vehicle (a). The DSECU selects/sets this other vehicle from among one or more of the other vehicles (that is, the one or more of the preceding vehicles) having a longitudinal distance Dfx(n) being a positive value. The first reference threshold is a value which becomes smaller as the longitudinal distance Dfx(n) becomes longer. It should be noted that the DSECU specifies/determines the other vehicle having a minimum value of the longitudinal distance Dfx(n) as the inter-vehicle-distance target vehicle (a), if there are a plurality of the other vehicles which have been determined (selected/set) in the manner as described above.

After specifying the inter-vehicle-distance target vehicle (a), the DSECU calculates a target acceleration Gtgt in accordance with any one of the following Expression (1) and Expression (2). In Expression (1) and Expression (2), Vfx(a) is a relative speed of the inter-vehicle-distance target vehicle (a) with respect to the own vehicle, each of k1 and k2 is a predetermined positive gain (coefficient), and ΔD1 is an inter-vehicle deviation (ΔD1=Dfx(a)−Dtgt) obtained by subtracting a "target inter-vehicle-distance Dtgt" from "the longitudinal distance Dfx(a) of the inter-vehicle-distance target vehicle (a)". The target inter-vehicle-distance Dtgt is calculated by multiplying a target inter-vehicle time Ttgt by the vehicle speed SPD of the own vehicle (that is, Dtgt=Ttgt×SPD). The target inter-vehicle time Ttgt is set by the driver through the use of the operation switch 18.

The DSECU determines the target acceleration Gtgt in accordance with the following Expression (1) when the value (k1×66D1+k2×Vfx(a)) is positive or zero. ka1 is a positive gain (coefficient) for accelerating the own vehicle and is set to a value equal to or smaller than "1". The DSECU determines the target acceleration Gtgt in accordance with the following Expression (2) when the value (k1×ΔD1+k2×Vfx(a)) is negative. kd1 is a positive gain (coefficient) for decelerating the own vehicle. In this example, kd1 is set to "1".

$$Gtgt(\text{for acceleration})=ka1\cdot(k1\cdot\Delta D1+k2\cdot Vfx(a)) \quad (1)$$

$$Gtgt(\text{for deceleration})=kd1\cdot(k1\cdot\Delta D1+k2\cdot Vfx(a)) \quad (2)$$

It should be noted that when the inter-vehicle-distance target vehicle is unable to be specified/determined due to absence of the preceding vehicle, the DSECU determines the target acceleration Gtgt based on a "target vehicle speed set by using the operation switch 18" and the "vehicle speed SPD" in such a manner that the vehicle speed SPD of the own vehicle becomes equal to the target vehicle speed.

The DSECU controls the engine actuators 31 by using the engine ECU 30, and if necessary, controls the brake actuator 41 by using the brake ECU 40 such that an acceleration of the own vehicle becomes equal to the target acceleration Gtgt.

<Lane Keeping Control>

The DSECU performs the lane keeping control only while the inter-vehicle-distance control is being performed. The DSECU performs the lane keeping control when the lane keeping control is requested through the operation of the operation switch 18. The lane keeping controls mainly includes a sectioned lane keeping control and the following-travel steering control.

The sectioned lane keeping control is a control for determining a target traveling line (or a target traveling course) based on the lane markers such as the white lines, the yellow lines, and the like, and for adjusting/changing the steering angle of the own vehicle in such a manner that the own vehicle travels along that traveling target line. The sectioned lane keeping control may be referred to as "an LTC or a Lane Trace Control" in some cases. Hereinafter, the lane marker is expressed as the "white line" for convenience.

The following-travel steering control is a control for specifying one of the preceding vehicles as the following-travel steering target vehicle, and for adjusting/changing the steering angle of the own vehicle in such a manner that the own vehicle travels along the target traveling line determined in accordance with a traveling trajectory of that specified following-travel steering target vehicle. The following-travel steering control and the sectioned lane keeping control may be also collectively referred to as "a TJA or a Traffic Jam Assist" in some cases. The following-travel steering control and the sectioned lane keeping control may be also collectively referred to as a "steering support control", because those controls are controls for supporting a steering operation of the driver. Hereinafter, description will be made in the order of the sectioned lane keeping control and the following-travel steering control.

<<Sectioned Lane Keeping Control>>

When at least any one of the left white line and the right white line is recognized by the camera sensor 17b over a predetermined distance in a forward direction of the own vehicle SV (i.e., in the x-axis direction), the DSECU sets/determines the target traveling line Ld based on at least one of the left white line and the right white line which has been recognized.

More specifically, when both of the left white line and the right white line have been recognized over the predetermined distance in the forward direction of the own vehicle SV, the DSECU sets/determines a line (a center line) passing through midpoints in a lane width direction between the left white line and the right white line, as the target traveling line Ld.

In contrast, when only one of the left white line and the right white line has been recognized over the predetermined distance in the forward direction of the own vehicle SV, the DSECU extrapolates/determines a position of the unrecognized white line (the other white line) based on the one recognized white line and a lane width which was obtained at a time point at which both of the left white line and the right white line were recognized. Then, the DSECU sets/determines the center line passing the midpoints between the one recognized white line and the other white line which is extrapolated, as the target traveling line Ld.

Furthermore, the DSECU applies the steering torque to the steering mechanism by using the steering motor 62 to change the steering angle of the own vehicle in such a manner that the lateral position of the own vehicle (i.e., the position of the own vehicle with respect to the own vehicle traveling lane) is maintained in the vicinity of the set target traveling line Ld, to thereby support a steering operation of the driver (for example, refer to Japanese Patent Application Laid-Open No. 2008-195402, No. 2009-190464, No. 2010-6279, and Japanese Patent No. 4349210). It should be noted that the steering control method will be described later in more detail.

<<Following-Travel Steering Control>>

When there is no white line recognized over the predetermined distance in the forward direction of the own vehicle SV, the DSECU selects the preceding vehicle suitable/appropriate for the following-travel steering target vehicle from among one or more of the other vehicles (the preceding vehicles) which travel in the front area of the own vehicle (as the following-travel steering target vehicle). The DSECU generates/produces a traveling trajectory (hereinafter, also referred to as a "preceding vehicle trajectory") of the following-travel steering target vehicle. The DSECU applies the steering torque to the steering mechanism so as to change the steering angle in such a manner that the own vehicle travels along (in accordance with) a target traveling line determined/set based on that preceding vehicle trajectory. In this example, the DSECU sets the preceding vehicle trajectory itself as the target traveling line Ld. It should be noted that the DSECU may set the target traveling line Ld to a line shifted in the lane width direction from the preceding vehicle trajectory by a predetermined distance.

Next, a method for determining the following-travel steering target vehicle, a method for producing/generating the preceding vehicle trajectory, and a method of the following-travel steering control will be described in more detail.

1. Method for Determining the Following-Travel Steering Target Vehicle

The DSECU determines the following-travel steering target vehicle based on the "target object information of the target object (n)" obtained by the surroundings monitoring sensor 17. More specifically, the DSECU determines (specifies) the following-travel steering target vehicle based on a behavior of the own vehicle and the target object information on the preceding vehicle, according to procedures/steps described below.

Step 1B: the DSECU acquires/obtains "the vehicle speed SPD of the own vehicle and the yaw rate Yrt of the own vehicle" which represent the motion state quantity of the own vehicle from the vehicle speed sensor 16 and the yaw rate sensor 19, respectively.

Step 2B: the DSECU predicts/extrapolates the traveling course in which the own vehicle will travel on the x-y coordinate system, based on the vehicle speed SPD and the yaw rate Yrt.

Step 3B: the DSECU determines (selects/sets) the other vehicle having "an absolute value of the distance in a lane width direction with respect to the extrapolated traveling course of the own vehicle" which is equal to or smaller than a predetermined second reference threshold, as the following-travel steering target vehicle. Note that the DSECU selects the following-travel steering target vehicle from among the other vehicle(s) (that is, the preceding vehicle(s)) having the longitudinal distance Dfx(n) being a positive value. The second reference threshold is set so as to decrease as the longitudinal distance Dfx(n) increases. That is, the DSECU determines/regards, as the following-travel steering target vehicle, the preceding vehicle which is present along the traveling course (the traveling course having at least a vehicle width of the own vehicle). If there are a plurality of the other vehicles which can be determined/specified as the following-travel steering target vehicle, the DSECU determines/specifies the other vehicle which has a minimum value of "an absolute of a distance in a lane width direction with respect to the extrapolated traveling course of the own vehicle" as the following-travel steering target vehicle. The second reference threshold may be the same as the above-described first reference threshold may be the same as or may be different from the above-described first reference threshold.

The DSECU stores the target object ID assigned/given to the determined following-travel steering target vehicle as a target object ID (a target vehicle ID) of the following-travel steering target vehicle (b) in the RAM. It should be noted that the "target vehicle ID" is also referred to as a "target vehicle identification information", for convenience.

2. Generating/Producing for Preceding Vehicle Trajectory

Figure 3:
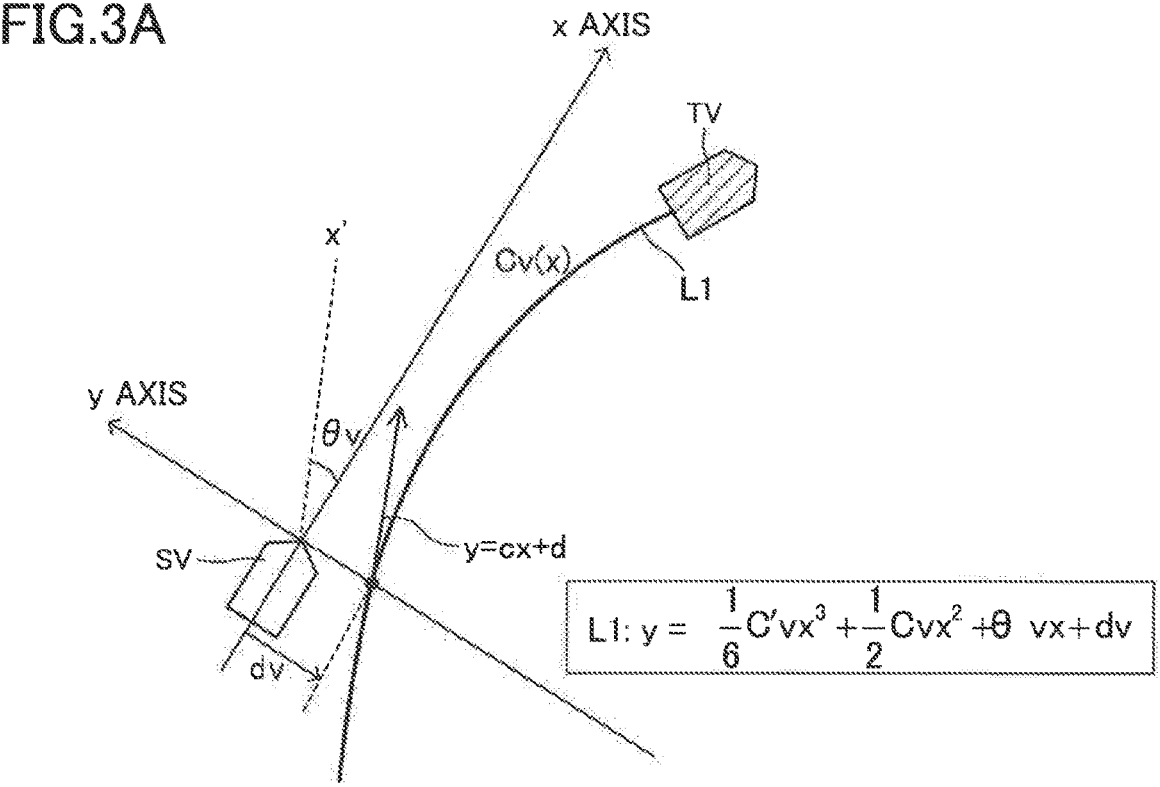

As shown in FIG. 2, the DSECU produces/generates a traveling trajectory L1 of the following-travel steering target vehicle TV (that is, the preceding vehicle trajectory L1). More specifically, as shown in FIG. 3A, it is known that the traveling trajectory L1 is approximated accurately with a curve line represented by a cubic function of the following Expression (3) in the above-described x-y coordinate system defined based on a present position of the own vehicle at a present time point.

$$y = (1/6)Cv'\cdot x^3 + (1/2)Cv\cdot x^2 + \theta v\cdot x + dv \tag{3}$$

Cv': Cv' is a curvature change rate (curvature change amount per unit distance (Δx) at an arbitrary position (x=x0, x0 is an arbitrary value) on the curve) of a curvature of the traveling trajectory of the following-travel steering target vehicle TV.

Cv: Cv is the curvature of the traveling trajectory L1 of the following-travel steering target vehicle TV when the following-travel steering target vehicle TV was present at the present position (x=0) of the own vehicle SV (that is, when the following-travel steering target vehicle TV was present at the position of (x=0, y=dv)).

θv: θv is an angle deviation between a "direction (a tangential direction of the traveling trajectory L1) of the traveling trajectory L1 when the following-travel steering target vehicle TV was present at the present position (x=0) of the own vehicle SV" and the "traveling direction ("+" direction of the x-axis) of the own vehicle SV". The θv is also referred to as the "yaw angle".

dv: dv is a distance dv in the y axis direction (substantially, in the lane width direction) between the present position (x=0, y=0) of the own vehicle SV and the traveling trajectory L1. This distance dv is also referred to as a "center distance".

The above-described Expression (3) is derived as follows. That is, as shown in FIG. 3B, the traveling trajectory L1 is defined by (or expressed as) the cubic function $f(x)=ax^3+bx^2+cx+d$. Using expressions and conditions shown in FIG. 3B, the relationships shown in FIG. 3C (that is, "the relationship between the coefficients (a, b, c and d) of the cubic function f(x), the curvature, and the like") are derived. Therefore, the DSECU calculates the coefficients (a, b, c, and d) of the cubic function f(x) based on the relationship shown in FIG. 3C, to thereby derive the above-described Expression (3).

Based on the above viewpoint, the DSECU calculates the coefficients (in other words, coefficients a, b, c, and d of the function f(x)) of the first to fourth terms on the right side of Expression (3) as follows.

The DSECU acquires/obtains the target object information on the following-travel steering target vehicle TV (hereinafter, referred to as a "target object (b)" in some cases) to store (buffer) position coordinate data at a time point at which the DSECU has acquired that target object information in the RAM, every time a predetermined measurement time elapses. The position coordinate data is indicative of a position (the longitudinal distance Dfx(n) and the lateral position Dfy(n)) of the following-travel steering target vehicle TV at the time point at which the DSECU has acquired/obtained that target object information. It should be noted in order to minimize data to be stored in the RAM, the DSECU may store only a limited number of "relatively new position coordinate data sets of the following-travel steering target vehicle TV" that have been acquired within a certain period up to the present time point and which includes the latest position coordinate data set, and discard the position coordinate data sets older than the data sets acquired within that certain period.

The DSECU converts the position coordinate data of the following-travel steering target vehicle TV stored in the RAM into the position coordinate data on the x-y coordinate system having the present position of the own vehicle SV at the present time point as the origin (x=0, y=0). This converting process is executed based on a difference between "the position and the traveling direction of the own vehicle SV" at the time point at which the DSECU acquired the position coordinate data and "the position and the traveling direction of the own vehicle SV" at the present time point. In the following description, an x coordinate of this converted position coordinate data is represented by (expressed as) "xi" and a y coordinate of this converted position coordinate is represented by (expressed as) "yi". The xi and the yi may be referred to as "converted position coordinates" in some cases. In this case, (xi, yi)=(x1, y1), (x2,y2), (x3,y3), (x4,y4) shown in FIG. 2 are examples of the converted position coordinates of the following-travel steering target vehicle TV which has been acquired in the manner as described above.

The DSECU executes a curve fitting process with the use of the converted position coordinates of the following-travel steering target vehicle TV to produce/generate the traveling trajectory L1 of the following-travel steering target vehicle TV. The curve used in this curve fitting process is a cubic curve (for example, the cubic curve is represented by the above-described cubic function f(x)). The curve fitting process is executed by a least squares method.

3. Performing of Following-Travel Steering Control

The DSECU sets the target traveling line Ld to the thus produced/generated traveling trajectory L1. Furthermore, the DSECU acquires/obtains information (hereinafter, referred to as "target traveling course information" in some cases) necessary for the following-travel steering control which is performed in accordance with the traveling trajectory L1 set as the target traveling line, based on the coefficients of the cubic function of Expression (3) and Expression (the relational expression) shown in FIG. 3C. The target traveling course information includes the curvature Cv of the traveling trajectory L1, the yaw angle θv with respect to the traveling trajectory L1, the center distance dv with respect to the traveling trajectory L1, and the like.

The DSECU calculates a target steering angle θ* by applying the curvature Cv, the yaw angle θv, and the center distance dv to the following Expression (4), every time a predetermined time elapses. In Expression (4), each of Klta1, Klta2, and Klta3 is a control gain determined in advance. Furthermore, the DSECU controls the steering motor 62 by using the steering ECU 60 in such a manner that the actual steering angle θ becomes equal to (coincides wit) the target steering angle θ*. In this manner, the steering control through the following-travel steering control is performed.

$$\theta^* = Klta1 \cdot Cv + Klta2 \cdot \theta v + Klta3 \cdot dv \quad (4)$$

It should be noted that the DSECU may calculate a target yaw rate YRc* through applying the curvature Cv, the yaw angle θv, and the center distance dv to the following Expression (5) every time the predetermined time elapses. In this case, the DSECU calculates a target steering torque Tr* for obtaining the target yaw rate YRc* with the use of a lookup table, based on the target yaw rate YRc* and the actual yaw rate YRt. Then, the DSECU controls the steering motor 62 by using the steering ECU 60 in such a manner that the actual steering torque Tra becomes equal to the target steering torque Tr*. In this manner as well, the steering control through the following-travel steering control is also performed. As understood from the above, as long as the DSECU can acquire/obtain the target traveling course information, the DSECU can perform the following-travel steering control without calculating the target traveling line Ld itself.

$$YRc^* = K1 \times dv + K2 \times \theta v + K3 \times Cv \quad (5)$$

The DSECU also uses the above-described Expression (4) or Expression (5), when the DSECU performs the above-described sectioned lane keeping control as well. More specifically, the DSECU calculates a curvature CL of the target traveling line Ld (that is, the center line of the own vehicle traveling lane) which has been set based on at least one of the left white line and the right white line, a distance dL in the y axis direction (substantially, the road width direction) between the center position in the vehicle width direction of the own vehicle and the target traveling line Ld, and a deviation angle θL (a yaw angle θL) formed between a direction (a tangential direction) of the target traveling line Ld and the traveling direction of the own vehicle SV.

Then, the DSECU replaces dv with dL, and replaces Cv with CL, in Expression (4) (or Expression (5)), to thereby calculate the target steering angle θ*. The DSECU controls the steering motor 62 in such a manner that the actual steering angle θ becomes equal to that target steering angle θ*. In this manner, the steering control by the sectioned lane keeping control is performed.

When the DSECU is unable to set the target traveling line Ld based on at least one of the left white line and the right white line, and the DSECU is unable to produce/generate the preceding vehicle trajectory (including a case where the DSECU is unable to determine the following-travel steering target vehicle), the DSECU cancels performing the lane keeping control. That is, in this case, the DSECU does not perform the lane keeping control.

<<Upper Limit Guard Values of Steering Angle and Steering Angle Speed>>

The DSECU limits the steering angle in the lane keeping control in such a manner that a magnitude of the steering angle does not exceed an upper limit guard value (hereinafter, also referred to as a "steering angle guard value"). Furthermore, the DSECU limits the steering angle speed (change amount of the steering angle per unit time) in the lane keeping control in such a manner that a magnitude of the steering angle speed does not exceed an upper limit guard value (hereinafter, also referred to as a "steering angle speed guard value"). Thereby, sudden change in the behavior of the own vehicle due to the change in the steering angle can be prevented, so that the own vehicle can travel stably (the traveling stability of the own vehicle can be secured).

The descriptions above are about the outline of the lane keeping control,

<<Method for Coping a Case where Target Object ID of Following-Travel Steering Target Vehicle has Changed>>

Next, "a method (processes) for coping a case where the target object ID of the following-travel steering target vehicle has changed" which the DSECU of the present embodiment apparatus executes will be described. First, referring to examples shown in FIG. 4 and FIG. 5, a problem which a reference apparatus (i.e., a DSECU of a vehicle driving support apparatus to be compared with the present embodiment apparatus) may have will be described. The DSECU of the reference apparatus is referred to as a "reference ECU". At a time point at which the following-travel steering target vehicle has switched/changed (that is, when the target vehicle ID has changed), the reference ECU resets/clears the target traveling line determined/calculated based on the traveling trajectory of the following-travel steering target vehicle produced/generated up to that time point, and starts producing/generating a traveling trajectory of a new following-travel steering target vehicle.

Figure 4:
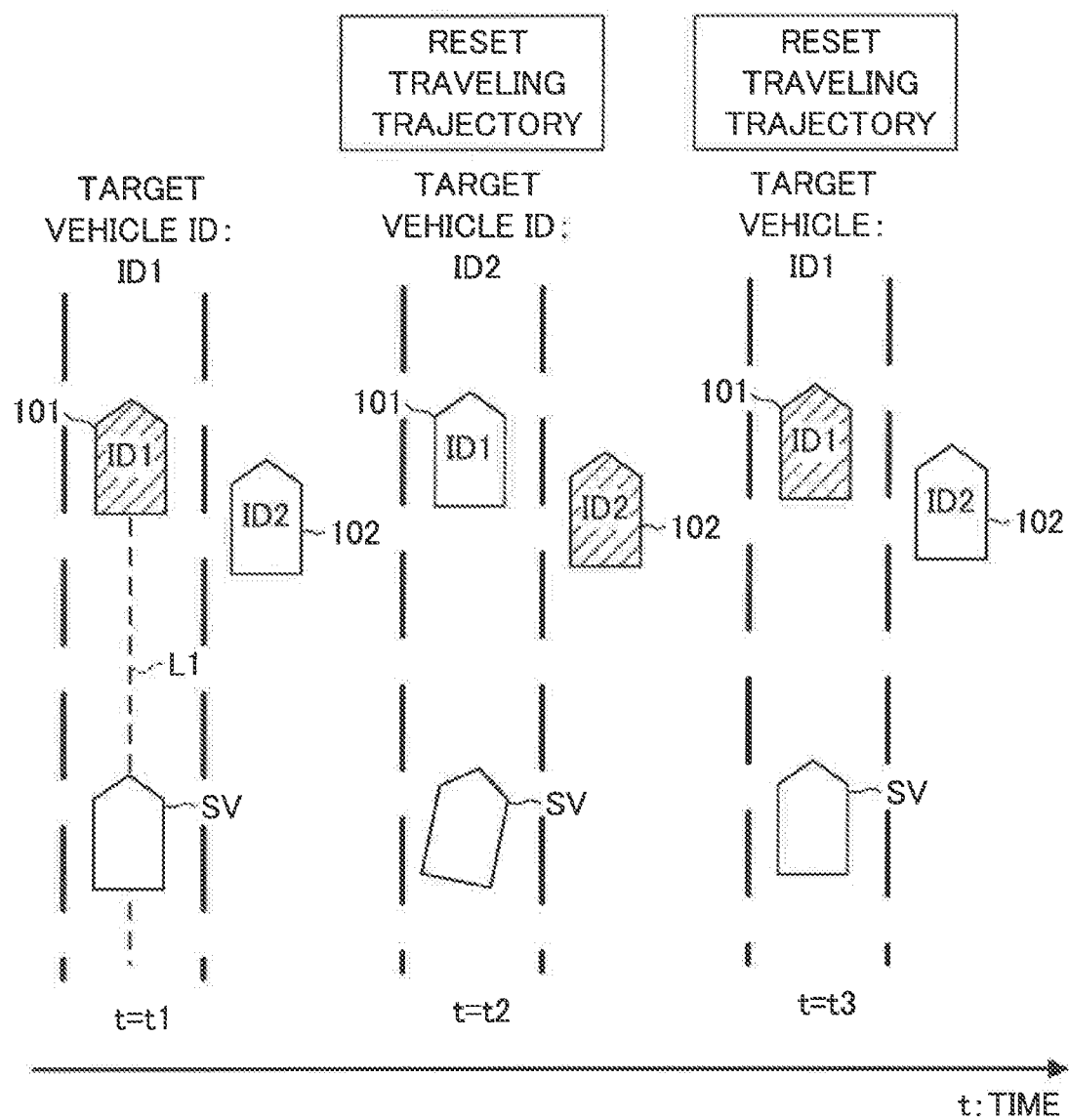
FIG. 4 is a plan view showing a road and a vehicle for illustrating an operation of the vehicle driving support apparatus according to the embodiment of the present invention.

In the example shown in FIG. 4, at a time t1, the reference ECU has been selecting a first vehicle 101 as the following-travel steering target vehicle. Therefore, the reference ECU has acquired/obtained a target object ID (=ID1) of the first vehicle 101 as the target vehicle ID, and has stored the acquired/obtained target object ID in the RAM. Accordingly, the reference ECU has been producing/generating the traveling trajectory L1 of the first vehicle 101 to perform the steering control (the following-travel steering control) of the own vehicle SV in such a manner that the own vehicle SV travels in accordance with the target traveling line (L1) determined based on the produced/generated traveling trajectory L1.

At a time t2 after the time t1, a state occurs where a "second vehicle 102 having "ID2" as the target object ID" appears which travels in parallel with and next to (side by side with) the first vehicle 101. In this example, a traveling direction of the own vehicle SV is a direction toward the second vehicle 102 by chance. Thus, the reference ECU erroneously determines/regards the second vehicle 102 as the following-travel steering target vehicle. In this case, since the target vehicle ID changes from "ID1" to "ID2", the reference ECU resets/clears the target traveling line (L1) determined/calculated based on the traveling trajectory L1.

In this example, at a time t3 after the time t2, the traveling direction of the own vehicle SV returns to the direction toward the first vehicle 101. Therefore, the reference ECU determines/regards the first vehicle 101 as the following-travel steering target vehicle again. In this case, since the target vehicle ID changes from ID2 to ID1, the reference ECU resets/clears the target traveling line determined/calculated based on the traveling trajectory of the second vehicle 102. Consequently, in the period from the time t2 to the time t3, the own vehicle follows an incorrect following-travel steering target vehicle. Furthermore, the own vehicle SV may not be able to travel stably until a traveling trajectory with a high degree of accuracy is produced/generated after the time t3.

As described above, when the target object ID is changed due to the erroneous selection of the following-travel steering target vehicle, the reference apparatus unnecessarily resets/clears "the target traveling line determined/calculated based on the traveling trajectory of a proper/appropriate/suitable following-travel steering target vehicle".

Figure 5:
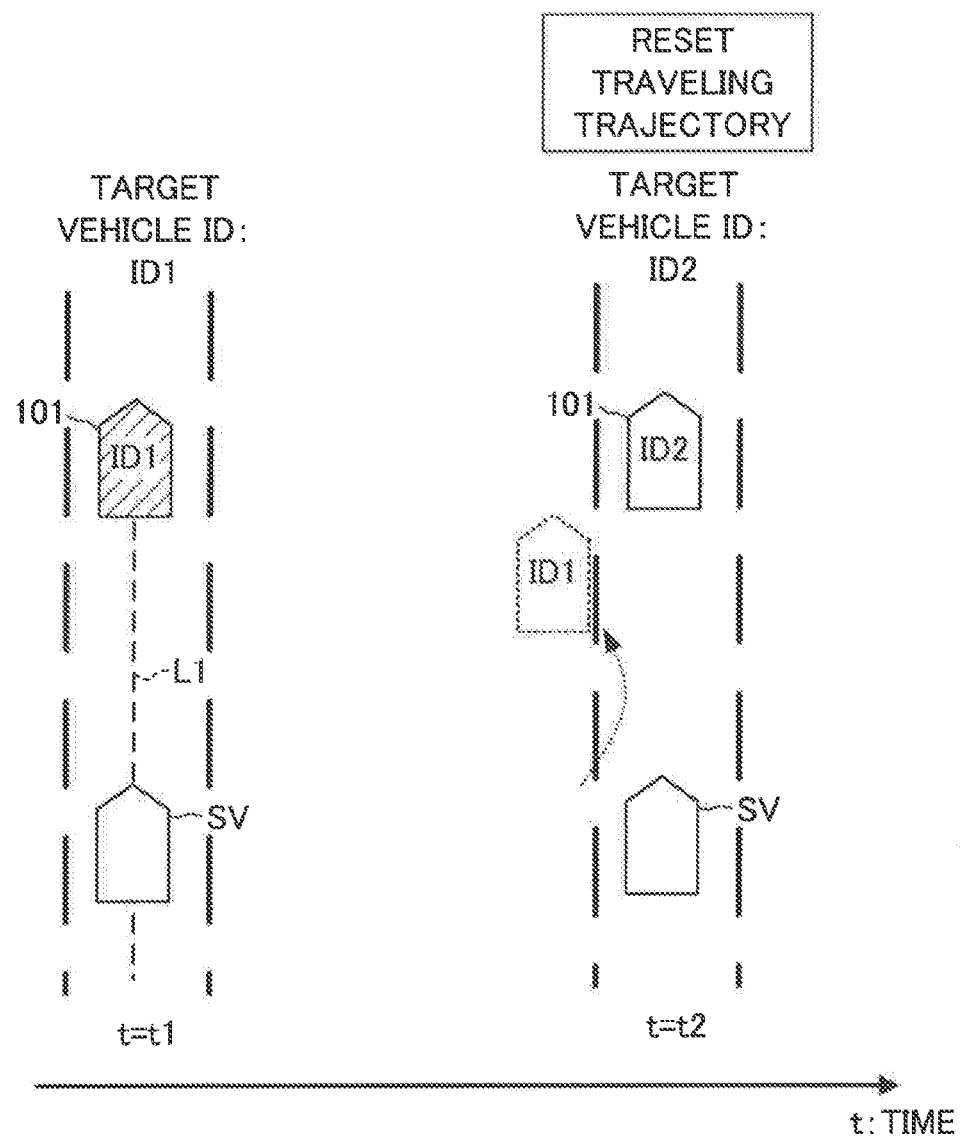
FIG. 5 is a plan view showing a road and a vehicle for illustrating the operation of the vehicle driving support apparatus according to the embodiment of the present invention.

Another example is shown in FIG. 5. In this example, at a time t1, the reference ECU is performing the following-travel steering control with the use of the target traveling line to which the traveling trajectory L1 determined/calculated based on the behavior of the following-travel steering target vehicle (i.e., the first vehicle 101 having the target object ID=ID1) is adopted.

In this example, at a time t2 after the time t1, the target object ID of the first vehicle 101 which was the following-travel steering target vehicle at the time t1 has changed from "ID1" to another target object ID (=ID2). Such a change in the target vehicle ID assigned/given to the same vehicle may occur, for example, when and after an other vehicle different from the first vehicle 101 approaches the first vehicle 101 so that the first vehicle 101 and the other vehicle are recognized as a single target object. That is, the target object ID (=ID1) which has been assigned/given to the first vehicle 101 is assigned/given (or handed over) to that recognized single target object. Thereafter, when that other vehicle moves away from the first vehicle 101, the target object ID of that other vehicle becomes the target ID (="ID1") which has been assigned/given to the first vehicle 101. A new target object ID (="ID2") is assigned/given to the first vehicle 101. In this case, since the target vehicle ID changes from "ID1" to "ID2", the target traveling line determined/calculated based on the traveling trajectory L1 of the first vehicle 101 is reset/cleared. Therefore, the own vehicle SV may not be able to travel stably up to a time point at which a traveling trajectory with a high degree of accuracy is again produced/generated after the time t2.

As described above, when the target object ID itself of the following-travel steering target vehicle erroneously changes to the other target ID as well, the reference apparatus also unnecessarily resets/clears "the target traveling line determined/calculated based on the traveling trajectory of the proper/appropriate/suitable following-travel steering target vehicle".

As understood from the examples shown in FIG. 4 and FIG. 5, even when the target vehicle ID has erroneously changed, the reference apparatus unfavorably clears/resets "the target traveling line determined/calculated based on the traveling trajectory of the proper following-travel steering target vehicle". Accordingly, the continuity of the target traveling line deteriorates/degrades, and this decreases the degree of accuracy of the target traveling line with respect to the traveling lane. Thus, the reliability of the following-travel steering control degrades/decreases.

In view of the above, the DSECU of the present embodiment apparatus operates as described below.

(1) In a period (hereinafter, also referred to as "a retention/holding period or a first period") from a time point at which the target vehicle ID has changed to a time point at which a first time T1 elapses from the time point at which the target vehicle ID has changed, the DSECU retains/keeps the target traveling line which was set/determined based on the traveling trajectory of the following-travel steering target vehicle immediately before the target vehicle ID changes, without resetting it, and continues performing the following-travel steering control in accordance with that retained target traveling line.

(2) When the vehicle (the preceding vehicle having the target object ID which is the same as (or identical to) the target object ID of the following-travel steering target vehicle specified immediately before the target vehicle ID changes) specified as the following-travel steering target vehicle is continuously (continues being) present in the vicinity of "the retained target traveling line and/or an extension line of the retained target traveling line" over "a second time T2 shorter than the first time T1" in the retention period, the DSECU produces/generates "a new traveling trajectory for (setting) the target traveling line" based on the position information of that following-travel steering target vehicle at and after a time point at which the second time T2 elapses. In this case, the DSECU produces/generates that new traveling trajectory in such a manner that the new traveling trajectory is continuous with (or is smoothly connected to) "the traveling trajectory which has been retained". Then, the DSECU determines the target traveling line based on that new traveling trajectory after the time point at which the second time T2 elapses.

(3) When "the vehicle specified as the following-travel steering target vehicle" is not continuously present in the vicinity of "the retained target traveling line and/or the extension line of the retained target traveling line" over the second time T2 in the retention period, the DSECU resets/clears the retained target traveling line and newly produces/generates a new traveling trajectory of the specified following-travel steering target vehicle to determine/calculate the target traveling line based on that newly produced/generated traveling trajectory, after a time point at which the retention period ends/elapses.

Figure 6:
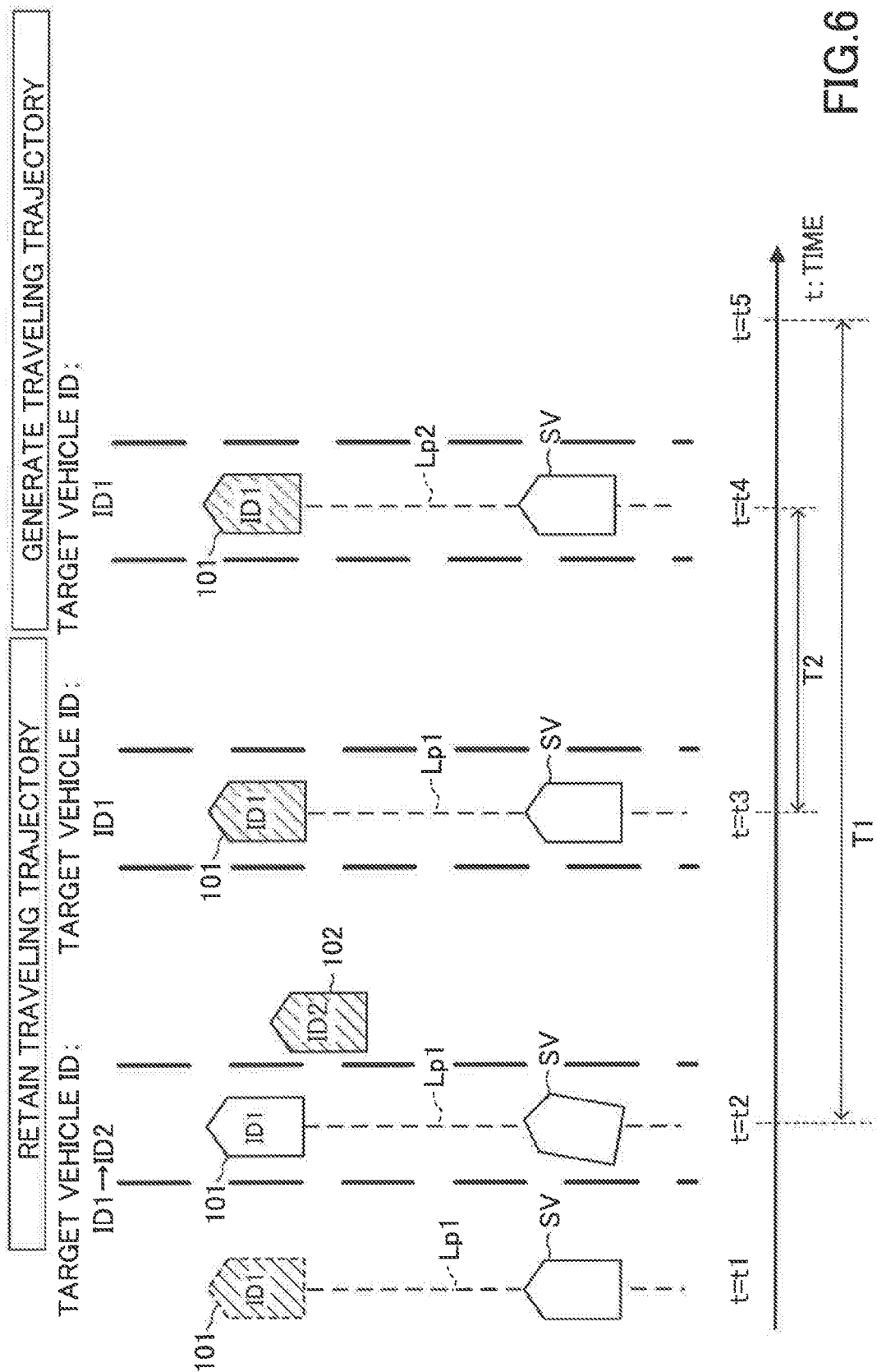
FIG. 6 is a plan view showing a road and a vehicle for illustrating the operation of the vehicle driving support apparatus according to the embodiment of the present invention.

For example, in the example shown in FIG. 6, the following-travel steering target vehicle (the first vehicle 101) at a time t1 and the following-travel steering target vehicle (the second vehicle 102) at a time t2 are different from each other. Therefore, the target vehicle ID changes from "ID1" to "ID2" at the time t2. After the time t2, the DSECU keeps/retains the target traveling line Lp1 determined based on the traveling trajectory of the following-travel steering target vehicle (the first vehicle 101) at the time t1 to perform the following-travel steering control in accordance with that target traveling line Lp1. The DSECU maintains/keeps this state from the time t1 to a time point (a time t5) at which the first time T1 elapses from the time t1 at the longest.

Thereafter, at a time t3, the first vehicle 101 is selected as the following-travel steering target vehicle again. In this example, the first vehicle 101 is present in the vicinity of "the retained target traveling line Lp1 and/or the extension line of the retained target traveling line Lp1". Furthermore, this state is maintained/kept until "the a time t4 after the second time T2 elapses from the time t3". The time t4 is a time point before the first time T1 elapses form the time t2. Therefore, after the time t4, the DSECU produces/generates the traveling trajectory Lp2 of the first vehicle 101 which is being selected as the following-travel steering target vehicle. At this time point, the traveling trajectory Lp2 is produced so as to be continuous with the target traveling line Lp1 which has been retained. After the time t4, the DSECU sets the traveling trajectory Lp2 as the target traveling line (or sets the target traveling line to the traveling trajectory Lp2), and performs the following-travel steering control using that target traveling line (i.e., the traveling trajectory Lp2).

It should be noted that when retaining (keeping) the target traveling line without resetting it, the DSECU is configured to store and keep the position information which was used for producing/generating the traveling trajectory Lp1 which was the basis of that target traveling line in the RAM in an identifiable manner. That is, the DSECU retains/holds the position coordinate data of the target object which was specified as the following-travel steering target vehicle immediately before the retention period, during the retention period in the RAM. Then, after the time point at which the second time T2 elapses, the DSECU produces/generates the new traveling trajectory by using the information which has been retained/stored in the RAM in the identifiable manner as well as the position information of the following-travel steering target vehicle which is acquired/obtained after the time point at which the second time T2 elapses.

Accordingly, even when the target vehicle ID is erroneously changed, since the continuity of the target traveling does not decrease/degrade, the possibility that the reliability of the following-travel steering control decreases/degrade can be reduced. Furthermore, when the following-travel steering target vehicle has not appeared in the vicinity of "the retained target traveling line Lp1 and/or the extension line of the retained target traveling line Lp1" over the second time T2 or more before the time point at which the retention period elapses (ends), the target traveling line is determined based on the traveling trajectory of the new preceding vehicle specified as the following-travel steering target vehicle after the time point at which the retention period elapses, after the retention period elapses (ends). This can eliminate the possibility of performing the following-travel steering control with the use of the target traveling line whose degree of accuracy has decreased after an excessively long time period has elapsed from the time point at which the retention of the traveling target line was started.

<<Lowering Guard Value>>

Furthermore, the DSECU lowers/reduces the upper limit guard value (the steering angle guard value) of the steering angle and the upper limit guard value (the steering angle speed guard value) of the steering angle speed in the period for which the following-travel steering control is performed based on the retained target traveling line Lp1. This is because the reliability of the target traveling line Lp1 which has been retained is relatively low (in other words, the probability that the target traveling line Lp1 is along the own vehicle traveling lane is relatively low).

More specifically, when performing the following-travel steering control based on "a target traveling line other than the retained target traveling line Lp1", the DSECU sets the steering angle guard value to a predetermined first steering angle guard value and sets the steering angle speed guard value to a predetermined first steering angle speed guard value.

When performing the following-travel steering control based on the retained target traveling line Lp1, the DSECU sets the steering angle guard value to "a second steering angle guard value smaller than the first steering angle guard value" and sets the steering angle speed guard value to "a second steering angle speed guard value smaller than the first steering angle speed guard value".

Therefore, the DSECU can prevent the steering angle of the own vehicle SV from greatly and/or suddenly changing, while the following-travel steering control is being performed based on the retained target traveling line Lp1. Accordingly, the DSECU can decrease/reduce the possibility that a case/state occurs where the traveling stability of the own vehicle decreases/degrades.

<<Specific Operation>>

Next, specific operations of the CPU (hereinafter, simply referred to as the "CPU") of the DSECU will be described. The CPU is configured to execute a routine (a following-travel steering control routine) shown by a flowchart in FIG. 7, every time a predetermined time elapses. It should be noted that the CPU is configured to perform the inter-vehicle-distance control (the ACC) according to an unillustrated routine. The CPU executes the routine shown in FIG. 7 only when the inter-vehicle-distance control is being performed.

It should be noted that the target traveling line is identical to the traveling trajectory in the following description. In other words, when the traveling trajectory is produced/generated, the target traveling line is set so as to be identical to that produced/generated traveling trajectory. When the traveling trajectory is retained, the target traveling line is set so as to be identical to that retained traveling trajectory. Furthermore, when the traveling trajectory is reset/cleared, the target traveling line is also reset/cleared.

Figure 7:
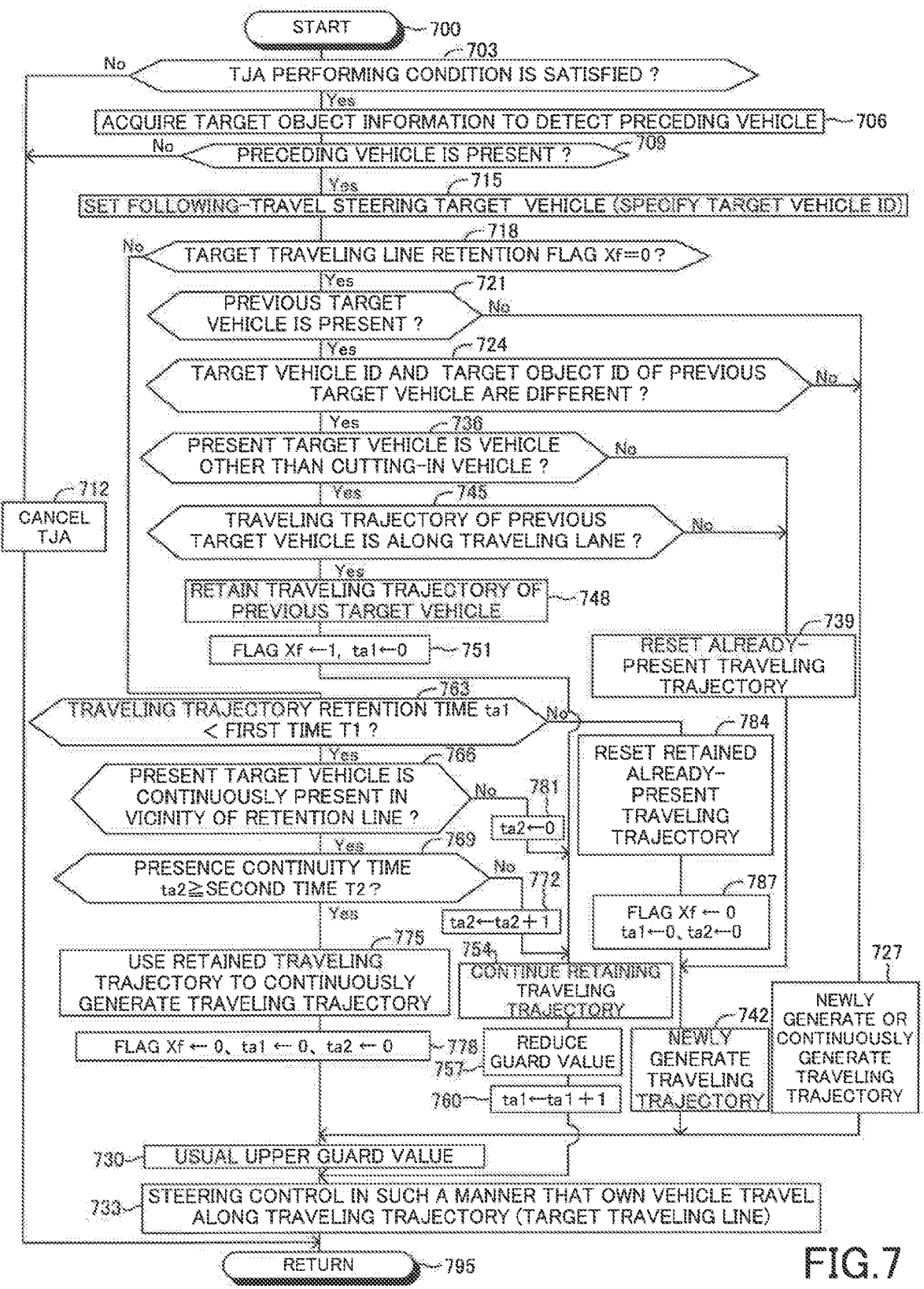
FIG. 7 is a flowchart showing a routine executed by the CPU of the driving support ECU provided on the vehicle driving support apparatus according to the embodiment of the present invention.

Therefore, when a predetermined time arrives while the inter-vehicle-distance control is being performed, the CPU starts processing from step 700 shown in FIG. 7 and proceeds to step 703 to determine whether or not a performing condition of the following-travel steering control (TJA) is satisfied. Hereinafter, the performing condition of the following-travel steering control (TJA) is referred to as a "TA performing condition"

The TJA performing condition is satisfied when all of the following conditions (conditions C1 to C3) are satisfied, for example.

The condition C1 is a condition satisfied when performing the lane keeping control is being selected through the operation of the operation switch 18.

The condition C2 is a condition satisfied when the vehicle speed SPD is equal to or greater/higher than a predetermined lower limit vehicle speed and is equal to or smaller/lower than a predetermined upper limit vehicle speed.

The condition C3 is a condition satisfied when the DSECU is unable to set the traveling target line Ld based on "at least one of the left white line and the right white line".

When the TJA performing condition is not satisfied, the CPU makes a "No" determination at step 703 and proceeds to step 712 to cancel (stop) the following-travel steering control. Thereafter, the CPU proceeds to step 795 to tentatively terminate the present routine.

In contrast, when the performing condition (the TJA performing condition) of the following-travel steering control is satisfied, the CPU makes a "Yes" determination at step 703 and proceeds to step 706 to detect the preceding vehicle through the use of surroundings monitoring sensor 17. More specifically, the CPU acquires/obtains the target object information of all of one or more of the target object(s) (n) which the surroundings monitoring sensor 17 is acquiring/obtaining. The CPU recognizes the target object (n) which is present within a predetermined front area of the own vehicle SV as the preceding vehicle, based on the target object information which has been acquired/obtained.

Thereafter, the CPU proceeds to step 709 to determine whether or not the preceding vehicle is present (that is, whether or not the preceding vehicle has been detected at step 706). When the preceding vehicle is not present, the CPU makes a "No" determination at step 709 and proceeds to step 712 to cancel (stop) the following-travel steering control. Thereafter, the CPU proceeds to step 795 to tentatively terminate the present routine.

In contrast, when the preceding vehicle is present, the CPU makes a "Yes" determination at step 709 and proceeds to step 715 to determine/specify the present/current target vehicle from among one or more of the preceding vehicles in accordance with the above-described processes of the steps 1B to 3B (refer to the above-described method for determining the following-travel steering target vehicle). The CPU acquires/obtains the target object ID of the determined present target vehicle as the target vehicle ID (the target object ID of the following-travel steering target vehicle), and stores the acquired/obtained target object ID in the RAM. Hereinafter, the present following-travel steering target vehicle is referred to the "present target vehicle".

Thereafter, the CPU proceeds to step 718 to determine whether or not a value of a target traveling line retention flag Xf is "0".

As described later, the value of the target traveling line retention flag Xf is set to "1" (refer to step 751) when it is determined that retaining (keeping) the target traveling line is appropriate. Furthermore, the value of the target traveling line retention flag Xf is set to "0" (refer to steps 778 and 787) when it is determined that terminating/stopping retaining (keeping) the target traveling line is appropriate. In other words, the target traveling line retention flag Xf indicates that the target traveling line is being retained when the value of the target traveling line retention flag Xf is "1". The target traveling line retention flag Xf indicates that the target traveling line is not being retained when the value of the target traveling line retention flag Xf is "0". It should be noted that the value of the target traveling line retention flag Xf is also set to "0" in an initialization routine (not shown) executed by the CPU when an unillustrated ignition key switch provided on the own vehicle SV is changed from an OFF position to an ON position.

When the value of the target traveling line retention flag Xf is "0", the CPU makes a "Yes" determination at step 718 and proceeds to step 721 to determine whether or not a vehicle (hereinafter, referred to as a "previous target vehicle") which was set/specified as the following-travel steering target vehicle at a time point (that is, at the previous calculation timing) at which the present routine was executed previously (that is, the predetermined time before the present time point) is also present as the preceding vehicle at the present time point. More specifically, the CPU determines whether or not there is the preceding vehicle having the same target object ID as (or the target object ID identical to) the target object ID of the previous target vehicle among the preceding vehicle(s) (the target object(s) (n)) which has/have been detected at step 709.

Now, it is assumed that the performing condition of the following-travel steering control (TJA) was not satisfied at the previous calculation timing and the performing condition of the following-travel steering control (TJA) becomes satisfied at the present calculation timing (that is, at the present time point). In this case, since the previous target vehicle was not present, the preceding vehicle having the same target object ID as (or the target object ID identical to) the target object ID of the previous target vehicle is not present. Therefore, the CPU makes a "No" determination at step 721 and proceeds to step 727 to produce/generate a new traveling trajectory based on the position information of the present target vehicle which was determined at step 715.

Thereafter, the CPU proceeds to step 730 to set the steering angle guard value θg to the first steering angle guard value θg1 and to set the steering angle speed guard value dθg to the first steering angle speed guard value dθg1. The first steering angle guard value θg1 is a normally used (usual) upper steering angle guard value. The first steering angle speed guard value dθg1 is a normally used (usual) steering angle speed guard value. It should be noted that a process for limiting an actual steering angle in such a manner that a magnitude of the actual steering angle does not exceed the first steering angle guard value θg1 is referred to as a "first steering angle magnitude limitation process". Furthermore, a process for limiting the actual steering angle in such a manner that a magnitude of an actual steering angle speed which is a change amount of the actual steering angle per unit time does not exceed the first steering angle speed guard value dθg1 is referred to as a "first steering angle speed magnitude limitation process".

Thereafter, the CPU proceeds to step 733 to set the target traveling line to "the traveling trajectory produced/generated based on the present following-travel steering target vehicle" at step 727, and to control the steering angle of the own vehicle SV (perform the steering control) so as to cause the own vehicle SV to travel along that set target traveling line. That is, the CPU performs the following-travel steering control. It should be noted that the following-travel steering which is performed with the use of the target traveling line to which "the traveling trajectory which has been generated based on the present following-travel steering target vehicle" is adopted is also referred to as a "first following-travel steering control", for convenience.

In addition, when executing the process of the step 733, the CPU limits "the target steering angle θ* which has been calculated through the use of the above-described Expression (4) or (5)" by/with the steering angle guard value θg and the steering angle speed guard value dθg.

More specifically, if a magnitude of the target steering angle θ* is equal to or larger than the steering angle guard value θg (θg>0), the CPU changes the target steering angle θ* in such a manner that the target steering angle θ* has a magnitude equal to the steering angle guard value θg. That is, if the target steering angle θ* is a positive value and is larger than the steering angle guard value θg, the CPU sets the target steering angle θ* to "θg". Furthermore, if the target steering angle θ* is a negative value and its magnitude |θ*| is larger than the steering angle guard value θg, the CPU sets the target steering angle to "−θg".

Furthermore, the CPU subtracts the "target steering angle θ* (that is, the previous target steering angle θ*p) calculated the predetermined time (Δt) before (in other words, calculated at a time point at which the present routine was previously executed)" from the "target steering angle θ* (that is, the present target steering angle θ*n) calculated at the present time point", to thereby calculate a target steering angle change amount (θ*n−θ*p). In this case, if the target steering angle θ* calculated in the present routine is limited by the steering angle guard value θg as described above, the limited value is used as the present target steering angle θ*n for calculation of the target steering angle change amount (θ*n−θ*p). Furthermore, the CPU divides the target steering angle change amount (θ*n−θ*p) by the predetermined time (Δt) to thereby calculate a target steering angle change amount per unit time (θ*n−θ*p)/Δt.

Then, when a magnitude of the target steering angle change amount per unit time (θ*n−θ*p)/Δt| is equal to or larger than the steering angle speed guard value dθg (dθg>0), the CPU changes θ*n in such a manner that the magnitude |(θ*n−θ*p)/Δt| is equal to the steering angle speed guard value dθg. That is, if the target steering angle change amount per unit time (θ*n−θ*p)/Δt is a positive value and is larger than the steering angle speed guard value dθg, the CPU sets the target steering angle to a "value (=θ*p+dθg×Δt) obtained by adding the value dθg×Δt to the value θ*p". If the target steering change amount per unit time ((θ*n−θ*p)/Δt) is a negative value and its magnitude |(θ*n−θ*p)/Δt| is larger than the steering angle speed guard value dθg, the CPU sets the target steering angle to a "value (=θ*p−dθg×Δt) obtained by subtracting the value dθg×Δt from the value θ*p".

The CPU controls the steering motor 62 in such a manner that the actual steering angle θ coincides with the target steering angle θ* determined as described above. As a result, the steering angle θ is changed/controlled in such a manner that its magnitude |θ| does not exceed the steering angle guard value θg (this θg is currently set at the first steering angle guard value) and a magnitude |dθ/dt| of its change amount per unit time does not exceed the steering angle speed guard value dθg (this dθg is currently set at the first steering angle speed guard value).

In contrast, at the time point at which the CPU executes the process of the step 721, when the previous target vehicle is present as the preceding vehicle at the present time point (that is, the preceding vehicle having the same target object ID as (or the target object ID identical to) the target object ID of the previous target vehicle is present among the preceding vehicle(s) which has(have) been detected at step 709), the CPU makes a "Yes" determination at that step 721. Then, the CPU proceeds to step 724 to determine whether or not the present target vehicle ID which is the target object ID of the present target vehicle and the previous target vehicle ID which is the target object ID of the previous target vehicle are different from each other.

When the target object ID of the present target vehicle and the target object ID of the previous target vehicle are the same as each other, the present target vehicle is highly likely to be the same vehicle as the previous target vehicle.

Therefore, in this case (when the target object ID of the present target vehicle and the target object ID of the previous target vehicle are the same as each other (or not different from each other)), the CPU makes a "No" determination at step 724 to sequentially execute the processes of step 727, step 730, and step 733. Accordingly, the already-present traveling trajectory which has been produced/generated based on the previous target vehicle is not reset/cleared, and the traveling trajectory is updated so as to be continuous with the already-present traveling trajectory, based on the position information of the present target vehicle. Then, the following-travel steering control (the first following-travel steering control) is performed based on the same target traveling line as the produced (updated) traveling trajectory. Thereafter, the CPU proceeds to step 795 to tentatively terminate the present routine.

In contrast, when the target object ID of the present target vehicle (that is, the target vehicle ID) and the target object ID of the previous target vehicle are different from each other, there is a probability that the present target vehicle is erroneously selected/specified or a probability that an incorrect target ID is assigned/given to the present target vehicle.

In this case, it is not preferable that the traveling trajectory (that is, the target traveling line) be reset/cleared immediately.

Therefore, in this case, the CPU makes a "Yes" determination at step 724 and proceeds to step 736 to determine whether or not the present target vehicle is not a cutting-in vehicle (in other words, determine whether or not the present target vehicle is "a vehicle other than the cutting-in vehicle"). The cutting-in vehicle is the preceding vehicle which is cutting in or has completely cut in between the own vehicle and the previous target vehicle.

When both of the following "cutting-in determination condition 1 and cutting-in determination condition 2" are satisfied, the CPU determines that the present target vehicle is the cutting-in vehicle. In other words, when at least one of "the cutting-in determination condition 1 and the cutting-in determination condition 2" is not satisfied, the CPU determines that the present target vehicle is not the cutting-in vehicle (that is, the present target vehicle is "the vehicle other than the cutting-in vehicle").

The cutting-in determination condition 1 is a condition satisfied when the longitudinal distance Dfx(n) of the present target vehicle is within a range between the longitudinal distance Dfx(=0) of the front-end part of the own vehicle SV and the longitudinal distance Dfx(n) of the previous target vehicle.

The cutting-in determination condition 2 is a condition satisfied when a first determination distance Dsy1 is equal to or smaller than a first determination distance threshold Dth. The first determination distance Dsy1 is a magnitude of a distance in the lane width direction between the lateral position Dfy(n) of the present target vehicle and the traveling trajectory of the previous target vehicle.

If the present target vehicle is determined to be the cutting-in vehicle, the traveling trajectory of that cutting-in vehicle should be set as the target traveling line. Therefore, in this case (when the present target vehicle is not "the vehicle other than the cutting-in vehicle"), the CPU makes a "No" determination at step 736 and proceeds to step 739 to reset/clear the traveling trajectory (the already-present traveling trajectory) which has been produced/generated based on the position information of the previous target vehicle up to the present time point. That is, the CPU erases/deletes "the already-present traveling trajectory which has been set as the target traveling line, the position information which has been used for producing/generating the already-present traveling trajectory, and the like" from the RAM.

Thereafter, the CPU proceeds to step 742 to produce/generate a new traveling trajectory based on the target object information (the position information) of the present target vehicle, and then the CPU sequentially executes the processes of the step 730 and step 733. As a result, the following-travel steering control (the first following-travel steering control) with the use of the target traveling line to which the generated traveling trajectory produced at step 742 is adopted is performed with the use of the usual/normal upper limit guard values. Thereafter, the CPU proceeds to step 795 to tentatively terminate the present routine.

In contrast, if the present target vehicle is not the cutting-in vehicle, there may be a case in which it is necessary for the CPU to retain the traveling trajectory which has been produced/generated. Therefore, in this case (i.e., when the present target vehicle is "the vehicle other than the cutting-in vehicle"), the CPU makes a "Yes" determination at step 736 and proceeds to step 745 to determine whether or not the traveling trajectory of the previous target vehicle is along the own vehicle traveling lane. For example, the CPU makes this determination as follows.

The CPU acquires/obtains the traveling trajectory of a "parallelly traveling vehicle" through executing an unillustrated routine. The parallelly traveling vehicle is the "preceding vehicle of the own vehicle SV" which travels in a lane (an adjacent lane) adjacent to the own vehicle traveling lane and whose change amount in the lateral position Dfy(n) within a predetermined time is equal to or smaller than a threshold. The CPU determines whether or not the traveling trajectory of the previous target vehicle and the traveling trajectory of the parallel vehicle are parallel to each other.

More specifically, the CPU calculates a change amount in "a distance between the traveling trajectory of the previous target vehicle and the traveling trajectory of the parallelly traveling vehicle" per unit distance in the traveling direction of these vehicles, based the traveling trajectories of these vehicles. When a magnitude of the calculated change amount is equal to or smaller than a predetermined change amount, the CPU determines that the traveling trajectory of the previous target vehicle and the traveling trajectory of the parallelly traveling vehicle are parallel to each other. In this case, the CPU determines that the traveling trajectory of the previous target vehicle is along the own vehicle traveling lane.

In contrast, the magnitude of the calculated change amount is greater than the predetermined change amount, the CPU determines that the traveling trajectory of the previous target vehicle and the traveling trajectory of the parallelly traveling vehicle are not parallel to each other. In this case, the CPU determines that the traveling trajectory of the previous target vehicle is not along the own vehicle traveling lane (for example, refer to Japanese Patent Application Laid-Open No. 2004-322916). It should be noted that, when the traveling trajectory of the parallelly traveling vehicle has not been acquired/obtained, the CPU regards that the traveling trajectory of the previous target vehicle is not along the own vehicle traveling lane.

If the traveling trajectory of the previous target vehicle is determined not to be along the own vehicle traveling lane, the already-present traveling trajectory of the previous target vehicle should not be retained (kept) as the target traveling line. Therefore, in this case, the CPU makes a "No" determination at step 745 to sequentially execute the processes of step 739, step 742, step 730, and step 733. Accordingly, the already-present traveling trajectory which has been produced/generated based on the information on the previous target vehicle is reset/cleared, and thereafter, the following-travel steering control (the first following-travel steering control) with the use of the target traveling line to which the new generated traveling trajectory based on the information on the present target vehicle is adopted is performed with the use of the usual/normal upper limit guard values. Thereafter, the CPU proceeds to step 795 to tentatively terminate the present routine.

In contrast, when the traveling trajectory of the previous target vehicle is determined to be along the own vehicle traveling lane, the CPU makes a "Yes" determination at step 745 to sequentially execute the processes of steps 748 to 760 described below. Thereafter, the CPU executes the process of step 733 and then proceeds to step 795 to tentatively terminate the present routine.

Step 748: the CPU stores the traveling trajectory of the previous target vehicle which has been produced/generated up to the present time point in the RAM as the target traveling line, and stores the position information (the position coordinate data) which has been used for producing/ generating that traveling trajectory of the previous target vehicle in the RAM as the position information on the target traveling line. The CPU thereby retains/keeps the target traveling line which is the traveling trajectory which has been produced/generated up to the present time point.

Step 751: the CPU sets the value of the target traveling line retention flag Xf to "1" and sets (clears) a value of a traveling trajectory retention time ta1 (a retention time ta1) to "0".

Step 754: the CPU continues retaining the traveling trajectory (the target traveling line) which was retained at step 743. That is, the CPU does not erase/delete the information (the target traveling line and the position information on the target traveling line) which was stored in the RAM at step 748.

Step 757: the CPU lowers/reduces the steering angle guard value θg and the steering angle speed guard value dθg. More specifically, the CPU sets the steering angle guard value θg to the second steering angle guard value θg2, and sets the steering angle speed guard value dθg to the second steering angle speed guard value dθg2. The second steering angle guard value egg is smaller than the first steering angle guard value θg1, and the second steering angle speed guard value dθg2 is smaller than the first steering angle speed guard value dθg1. It should be noted that a process for limiting an actual steering angle in such a manner that the magnitude of the actual steering angle does not exceed the second steering angle guard value θg2 is referred to as a "second steering angle magnitude limitation process". Furthermore, a process for limiting the actual steering angle in such a manner that the magnitude of an actual steering angle speed which is the change amount of the actual steering angle per unit time does not exceed the second steering angle speed guard value dθg2 is referred to as a "second steering angle speed magnitude limitation process".

Step 760: the CPU increases the value of the retention time ta1 by "1".

Step 733: the CPU controls the steering angle of the own vehicle SV so as to cause the own vehicle SV to travel along the traveling trajectory which has been retained as the target traveling line Ld.

As a result, the steering angle θ is controlled in such a manner that its magnitude |θ| does not exceed the steering angle guard value θg (this θg is currently set at the second steering angle guard value θg2) and the magnitude |dθ/dt| of its change amount per unit time does not exceed the steering angle speed guard value dθg (this dθg is currently set at the second steering angle speed guard value dθg2). It should be noted that the following-travel steering which is performed with the use of the target traveling line to which "the traveling trajectory which has been retained" is adopted is also referred to as a "second following-travel steering control", for convenience. Thereafter, the CPU proceeds to step 795 to tentatively terminate the present routine.

When this state continues, since the value of the target traveling line retention flag Xf has been set to "1", the CPU makes a "No" determination at that step 718 at a time point at which the CPU proceeds to step 718 after starting the processes of the present routine next time, and proceeds to step 763.

The CPU determines whether or not the retention time ta1 is smaller than the first time T1 at step 763. At this time point, the traveling trajectory retention time ta1 is smaller than the first time T1. Therefore, the CPU makes a "Yes" determination at step 763 and proceeds to step 766 to determine whether or not the present target vehicle is continuously present in the vicinity of "the retained target traveling line which (that is, the traveling trajectory which has been retained) and the extension line of that retained target traveling line". Hereinafter, "the target traveling line which has been retained (that is, the traveling trajectory which has been retained) and the extension line of that target traveling line" is simply and collectively referred to as a "retention line".

When all of the following presence continuation determination conditions 1 to 3 are satisfied, the CPU determines that the present target vehicle is continuously present in the vicinity of the retention line.

The presence continuation determination condition 1 is a condition satisfied when the present target vehicle is present in the vicinity of the retention line.

The presence continuation determination condition 2 is a condition satisfied when the previous target vehicle is present in the vicinity of the retention line.

The presence continuation determination condition 3 is a condition satisfied when the target object ID of the present target vehicle and the target object ID of the previous target vehicle are the same as each other.

It should be noted that, when a distance (hereinafter, also referred to as a "second determination distance Dsy2") in the lane width direction between a certain vehicle and the retention line is equal to or smaller than a second determination distance threshold Dth2, that certain vehicle is determined to be present in the vicinity of the retention line.

When the present target vehicle is continuously present in the vicinity of the retention line, the CPU makes a "Yes" determination at step 766 and proceeds to step 769 to determine whether or not a time (period) (hereinafter, referred to as a "presence continuity time ta2") for which the present target vehicle is continuously present in the vicinity of the retention line is equal to or greater/longer than the second time T2. It should be noted that the second time T2 is set to a smaller value than the above-described first time T1.

When the presence continuity time ta2 is smaller/shorter than the second time T2, the CPU makes a "No" determination at step 769 and proceeds to step 772 to increase a value of the presence continuity time ta2 by "1". Thereafter, the CPU sequentially executes the processes of step 754, step 757, step 760, and step 733. As a result, the following-travel steering control (the second following-travel steering control) with the use of the target traveling line to which the retained traveling trajectory is adopted is performed with the use of the upper limit guard values (θg2 and dθg2), each of which is smaller than the respective usual/normal upper limit guard values. Thereafter, the CPU proceeds to step 795 to tentatively terminate the present routine.

When this state continues thereafter, since the process of step 772 is executed repeatedly, the presence continuity time ta2 becomes equal to or greater/longer than the second time T2. When the presence continuity time ta2 becomes equal to or greater than the second time T2, the CPU makes a "Yes" determination at step 769 to sequentially execute the following processes of step 775 and step 778.

Step 775: the CPU produces/generates the traveling trajectory of the present target vehicle in such a manner that the traveling trajectory is continuous with "the traveling trajectory which has been retained". More specifically, the CPU produces/generates the traveling trajectory through executing the above-described curve fitting process according to the least squares method using "the position information (the position coordinate data) stored in the RAM" which has been used for producing/generating the retained traveling trajectory, and "the position information (the information coordinate data) of the present target vehicle". Then, the CPU sets the target traveling line to the produced/generated traveling trajectory.

Step 778: the CPU sets the value of the target traveling line retention flag Xf to "0" and clears both of the value of the traveling trajectory retention time t1 and the value of the presence continuity time t2 (sets these values to "0").

Thereafter, the CPU sequentially executes the processes of step 730 and step 733 and proceeds to step 795 to tentatively terminate the present routine. As a result, the following-travel steering control based on (with the use of the same target traveling line as the traveling trajectory which has been produced/generated at step 775 is performed with the use of the usual/normal upper limit guard values. It should be noted that the following-travel steering control wherein the traveling trajectory of the present target vehicle is produced/generated in such a manner that the traveling trajectory of the present target vehicle is continuous with "the traveling trajectory which has been retained", and that produced/generated traveling trajectory of the present target vehicle is used/set as the target traveling line is also referred to as a "third following-travel steering control", for convenience.

Meanwhile, when the present target vehicle is not continuously present in the vicinity of the retention line at the time point at which the CPU executes the process of step 766, the CPU proceeds to step 781 from step 766 to clear the value of the presence continuity time ta2 (set this value to "0"). Thereafter, the CPU sequentially executes the processes of steps 754 to 760, and step 733. As a result, the following-travel steering control (the second following-travel steering control) with the use of the traveling trajectory which has been retained is performed. Thereafter, the CPU proceeds to step 795 to tentatively terminate the present routine.

Furthermore, the CPU makes a "No" determination at step 763 when the traveling trajectory retention time (the retention time) ta1 becomes equal to or greater/longer than the first time T1 before a state where the present target vehicle is continuously present in the vicinity of the retention line continues for the second time T2 or more (i.e., before the presence continuity time ta2 becomes equal to or greater/longer than the second time T2). The state where the present target vehicle is not continuously present in the vicinity of the retention line includes a case where a "state in which the present target vehicle is present in the vicinity of the retention line" has not occurred. Then, the CPU sequentially executes the processes of step 784, step 787, and step 742, describe below.

Step 784: the CPU erases/deletes "the traveling trajectory as the target traveling line, and the position information for that traveling trajectory" stored at step 748 from the RAM.

Step 787: the CPU sets the value of the target traveling line retention flag Xf to "0", and clears "the value of the traveling trajectory retention time t1 and the value of the presence continuity time t2" (sets these values to "0").

Step 742: the CPU produces/generates a new traveling trajectory based on the target object information (the position information) of the present target vehicle.

Thereafter, the CPU sequentially executes the processes of steps 730 and step 733 and proceeds to step 795 to tentatively terminate the present routine. As a result, the following-travel steering control with the use of the traveling trajectory produced/generated at step 742 is performed with the use of the usual/normal upper limit guard values.

According to the above-described present embodiment apparatus, even when the target vehicle ID has changed, the traveling trajectory serving as the basis of the target traveling line is not reset/cleared unnecessarily/undesirably. Therefore, the possibility that the degree of accuracy of the target traveling line decreases due to a decrease in the continuity of the traveling trajectory can be reduced, so that the possibility that the reliability of the following-travel steering control decreases can be decreased.

Modified Examples

The embodiment of the present invention has been specifically described above, however, the present invention is not limited to the above embodiment, and various modified examples based on the technical idea within the scope of the present invention can be adopted.

For example, although the present embodiment apparatus is configured to perform the lane keeping control only while the following-travel inter-vehicle-distance control is being performed, it may be configured to perform the lane keeping control even while the following-travel inter-vehicle-distance control is not being performed.

For example, the present embodiment apparatus may be configured to acquire/obtain the position information, the speed information, and the like, of the one or more of the other vehicles including the following-travel steering target vehicle and the inter-vehicle-distance target vehicle through an inter-vehicle communication. More specifically, for example, the other vehicle may transmit the position information of the other vehicle acquired by using the navigation device of the other vehicle to the own vehicle SV together with a vehicle identification signal for identifying the other vehicle itself, and the own vehicle may acquire/obtain the position information of the following-travel steering target vehicle and/or the inter-vehicle-distance target vehicle based on the information transmitted from the other vehicle.

Furthermore, the method for producing/generating the traveling trajectory is not limited to the above-described example, and various known methods can be adopted. That is, any one of methods for generating the traveling trajectory which is capable of generating a curve line which approximates the traveling trajectory (the preceding vehicle trajectory) of the following-travel steering target vehicle is used. For example, the traveling trajectory may be generated by the use of a Karman filter.

More specifically, at each of steps 727, 742, and 775, the CPU may produce/generate the traveling trajectory by the use of the Karman filter. When the position information of the own vehicle is inputted into the Karman filter provided on the driving support ECU (DSECU), the Karman filter outputs the following parameters.

the curvature Cv of the traveling trajectory L1 of the following-travel steering target vehicle at the present position of the own vehicle SV, the curvature change rate CV' of the traveling trajectory L1, the yaw angle θv of the own vehicle with respect to the traveling trajectory L1, and the distance dv between the traveling trajectory L1 and the present position of the own vehicle SV The coefficients a, b, c, and d of the cubic function f(x) can be calculated through the use of the relationship shown in FIG. 3C between the coefficients of the cubic function f(x), the curvature, the yaw angle, and the like.

In addition, the DSECU of the present embodiment apparatus is configured to perform all of the first steering angle magnitude limitation process, the first steering angle speed magnitude limitation process, the second steering angle magnitude limitation process, and the second steering angle speed magnitude limitation process. In contrast, the DSECU may perform only one of "a combination of the first steering angle magnitude limitation process and the second steering angle magnitude limitation process" and "a combination of the first steering angle speed magnitude limitation process and the second steering angle speed magnitude limitation process".

What is claimed is:

1. A vehicle driving support apparatus comprising:
   a surroundings monitoring sensor configured to acquire target object information including position information indicative of a longitudinal distance with respect to an own vehicle of a preceding vehicle traveling in a front area of said own vehicle and a lateral distance with respect to said own vehicle of said preceding vehicle, and a target object ID for identifying said preceding vehicle; and
   an electronic control unit including a processor programmed to, every time a predetermined time elapses:
      specify a following-travel steering target vehicle from among one or more of said preceding vehicles based on said target object information and a traveling direction of said own vehicle which is extrapolated based on a driving state of said own vehicle;
      acquire said target object ID of said specified following-travel steering vehicle as a target vehicle ID; and
   perform a following-travel steering control to change a steering angle of said own vehicle in such a manner that said own vehicle travels along a target traveling line,
   wherein,
   said electronic control unit is further programmed to:
      determine whether or not a present target vehicle ID which is said target vehicle ID lastly acquired and a previous target vehicle ID which is said target vehicle ID acquired before said present target vehicle ID is acquired are different from each other,
      when it is determined that said present target vehicle ID and said previous target vehicle ID are identical to each other, produce a traveling trajectory of said preceding vehicle having said present target vehicle ID based on said position information of said preceding vehicle having said present target vehicle ID and determine said target traveling line based on said produced traveling trajectory of said preceding vehicle having said present target vehicle ID;
      when it is determined that said present target vehicle ID and said previous target vehicle ID are different from each other, retain an already-present traveling trajectory and determine said target traveling line based on said retained already-present traveling trajectory for a specific period from a determination time point at which it is determined that said present target vehicle ID and said previous target vehicle ID are different from each other to a time point at which a first time elapses from said determination time point, said already-present traveling trajectory being said traveling trajectory produced based on said position information of said preceding vehicle having said previous target vehicle ID up to said determination time point; and
      when, in said specific period, a specific situation occurs where said preceding vehicle having an identical target object ID continues being specified as said following-travel steering target vehicle over a second time shorter than said first time in an area having a distance which is equal to or smaller than a predetermined threshold distance in a lane width direction with respect to said target traveling line determined based on said retained traveling trajectory, produce said traveling trajectory of said preceding vehicle having said identical target object ID in such a manner that said traveling trajectory of said preceding vehicle having said identical target object ID is continuous with said already-present traveling trajectory based on said position information of said preceding vehicle having said identical target object ID and said retained already-present traveling trajectory and determine said target traveling line based on said produced traveling trajectory of said preceding vehicle having said identical target object ID.

2. The vehicle driving support control apparatus according to claim 1,
   wherein,
   said electronic control unit is further programmed to:
      perform a first steering angle magnitude limiting process for limiting said steering angle in such a manner that a magnitude of said steering angle does not exceed a first steering angle guard value, when performing said following-travel steering control using said target traveling line determined not based on said retained already-present traveling trajectory; and
      perform a second steering angle magnitude limiting process for limiting said steering angle in such a manner that said magnitude of said steering angle does not exceed a second steering angle guard value smaller than said first steering angle guard value, when performing said following-travel steering control using said target traveling line determined based on said retained already-present traveling trajectory but not based on said position information of said preceding vehicle having said present target vehicle ID.

3. The vehicle driving support control apparatus according to claim 1,
   wherein,
   said electronic control unit is further programmed to:
      perform a first steering angle speed magnitude limiting process for limiting said steering angle in such a manner that a magnitude of a steering angle speed which is an amount of change per unit time of said steering angle does not exceed a first steering angle speed guard value, when performing said following-travel steering control using said target traveling line determined not based on said retained already-present traveling trajectory; and
   perform a second steering angle speed magnitude limiting process for limiting said steering angle in such a manner that said magnitude of said steering angle does not exceed a second steering angle speed guard value smaller than said first steering angle speed guard value, when performing said following-travel steering control using said target traveling line determined based on said retained already-present traveling trajectory but not based on said position information of said preceding vehicle having said present target vehicle ID.

4. The vehicle driving support control apparatus according to claim 1
   wherein,
   when said specific situation does not occur in said specific period, said electronic control unit is further programmed to newly produce said traveling trajectory of said preceding vehicle having said present target vehicle ID based on said position information of said preceding vehicle having said present target vehicle ID without using said retained traveling trajectory to determine said target traveling line based on said newly produced traveling trajectory, after a time point at which said first time has elapsed from said determination time point.

5. The vehicle driving support control apparatus according to claim 1,
wherein,
said electronic control unit is further programmed to:
   determine whether or not said already-present traveling trajectory is along a traveling lane in which said own vehicle travels, when it is determined that said present target vehicle ID and said previous target vehicle ID are different from each other; and
   produce said traveling trajectory of said preceding vehicle having said present target vehicle ID based on said position information of said preceding vehicle having said present target vehicle ID without retaining said already-present traveling trajectory to determine said target traveling line based on said produced traveling trajectory of said preceding vehicle having said present target vehicle ID, when it is determined that said already-present traveling trajectory is not along said traveling lane.

6. The vehicle driving support control apparatus according to claim 1,
wherein,
said electronic control unit is further programmed to:
   determine whether or not said preceding vehicle having said present target vehicle ID is a cutting-in vehicle being a vehicle which is cutting in or has cut in between said preceding vehicle having said previous target vehicle ID and said own vehicle, when it is determined that said present target vehicle ID and said previous target vehicle ID are different from each other; and
   produce said traveling trajectory of said preceding vehicle having said present target vehicle ID based on said position information of said preceding vehicle having said present target vehicle ID without retaining said already-present traveling trajectory to determine said target traveling line based on said produced traveling trajectory of said preceding vehicle having said present target vehicle ID, when it is determined that said preceding vehicle having said present target vehicle ID is said cutting-in vehicle.

\* \* \* \* \*